(12) United States Patent
Onyeka

(10) Patent No.: US 9,726,367 B2
(45) Date of Patent: Aug. 8, 2017

(54) WATERING DEVICE INCORPORATING A LIGHT SOURCE

(71) Applicant: George Chidumam Onyeka, London (GB)

(72) Inventor: George Chidumam Onyeka, London (GB)

( * ) Notice: Subject to any disclaimer, the term of this patent is extended or adjusted under 35 U.S.C. 154(b) by 412 days.

(21) Appl. No.: 14/347,458

(22) PCT Filed: Sep. 20, 2012

(86) PCT No.: PCT/GB2012/000734
§ 371 (c)(1),
(2) Date: Mar. 26, 2014

(87) PCT Pub. No.: WO2013/041827
PCT Pub. Date: Mar. 28, 2013

(65) Prior Publication Data
US 2014/0306031 A1   Oct. 16, 2014

(30) Foreign Application Priority Data

Sep. 22, 2011  (GB) .................................. 1116401.9
Sep. 26, 2011  (GB) .................................. 1116557.8
Oct. 21, 2011  (GB) .................................. 1118278.9
Apr. 24, 2012  (GB) .................................. 1207122.1
Aug. 30, 2012  (GB) .................................. 1215386.2

(51) Int. Cl.
*A01G 29/00*    (2006.01)
*F21V 33/00*    (2006.01)
*A01G 27/00*    (2006.01)
*A47G 33/08*    (2006.01)
*A01G 25/02*    (2006.01)

(52) U.S. Cl.
CPC ............ *F21V 33/006* (2013.01); *A01G 25/02* (2013.01); *A01G 27/005* (2013.01); *A01G 27/006* (2013.01); *A47G 33/0881* (2013.01)

(58) Field of Classification Search
CPC ................................ A01G 25/02; A01G 29/10
USPC .............................................. 47/48.5; 239/19
See application file for complete search history.

(56) References Cited

U.S. PATENT DOCUMENTS

| | | | | |
|---|---|---|---|---|
| 1,579,305 | A | * | 4/1926 | Goldberg .................. A47G 7/06 362/101 |
| 2,784,529 | A | * | 3/1957 | Prestigiacomo ... A47G 33/0881 239/55 |
| 2,837,869 | A | * | 6/1958 | Chatten ................ A01G 27/006 47/48.5 |
| 5,217,696 | A | * | 6/1993 | Wolverton .............. A61L 9/037 422/120 |

(Continued)

*Primary Examiner* — Kristen C Hayes

(57) ABSTRACT

A Watering device incorporating a light source (5) consisting of at least one inner chamber (2) attached to the exterior surface of the reservoir (1), said inner chamber (2) projecting or extending inwardly, said reservoir (1) having a mouth (3) which is able to be screwed or attached easily to commonly available drip feed devices or watering spikes (4), the inner chamber (2) wall at the exterior surface of the reservoir or extending outwardly from the reservoir exterior surface having a hole to accommodate fully or partially a light source or light sources (5) within the chambers), said light sources providing illumination of the reservoir (1), the plant, and surroundings or part thereof.

22 Claims, 20 Drawing Sheets

(56) References Cited

U.S. PATENT DOCUMENTS

Figure 1:
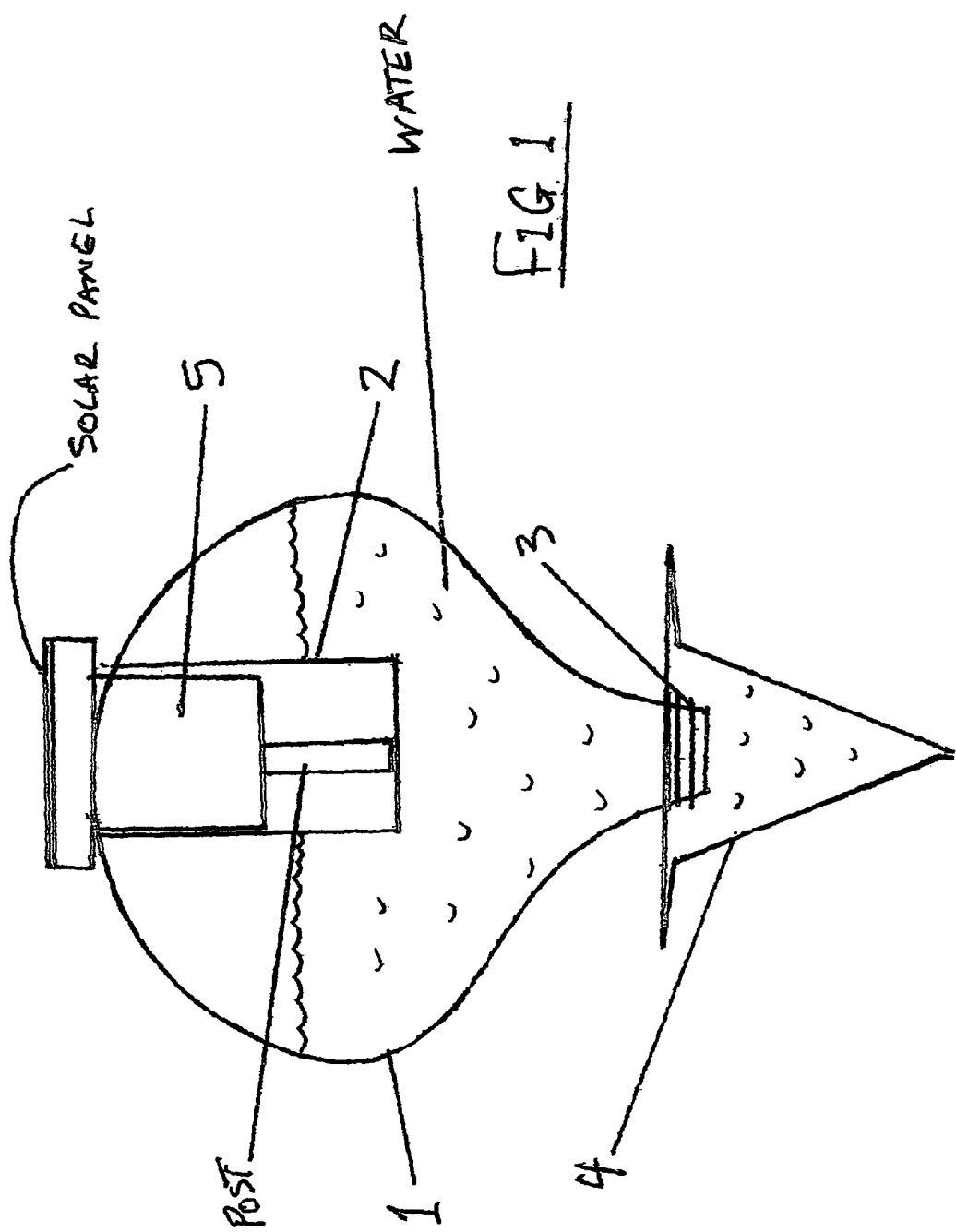

| | | | | |
|---|---|---|---|---|
| 5,547,721 A | * | 8/1996 | Kuo | ........................ A47G 7/06 |
| | | | | 428/34.1 |
| 5,675,931 A | * | 10/1997 | Wasserman | ............ A47G 7/041 |
| | | | | 211/78 |
| 2008/0092440 A1 | * | 4/2008 | Johnson | ............. A01G 13/0212 |
| | | | | 47/48.5 |

* cited by examiner

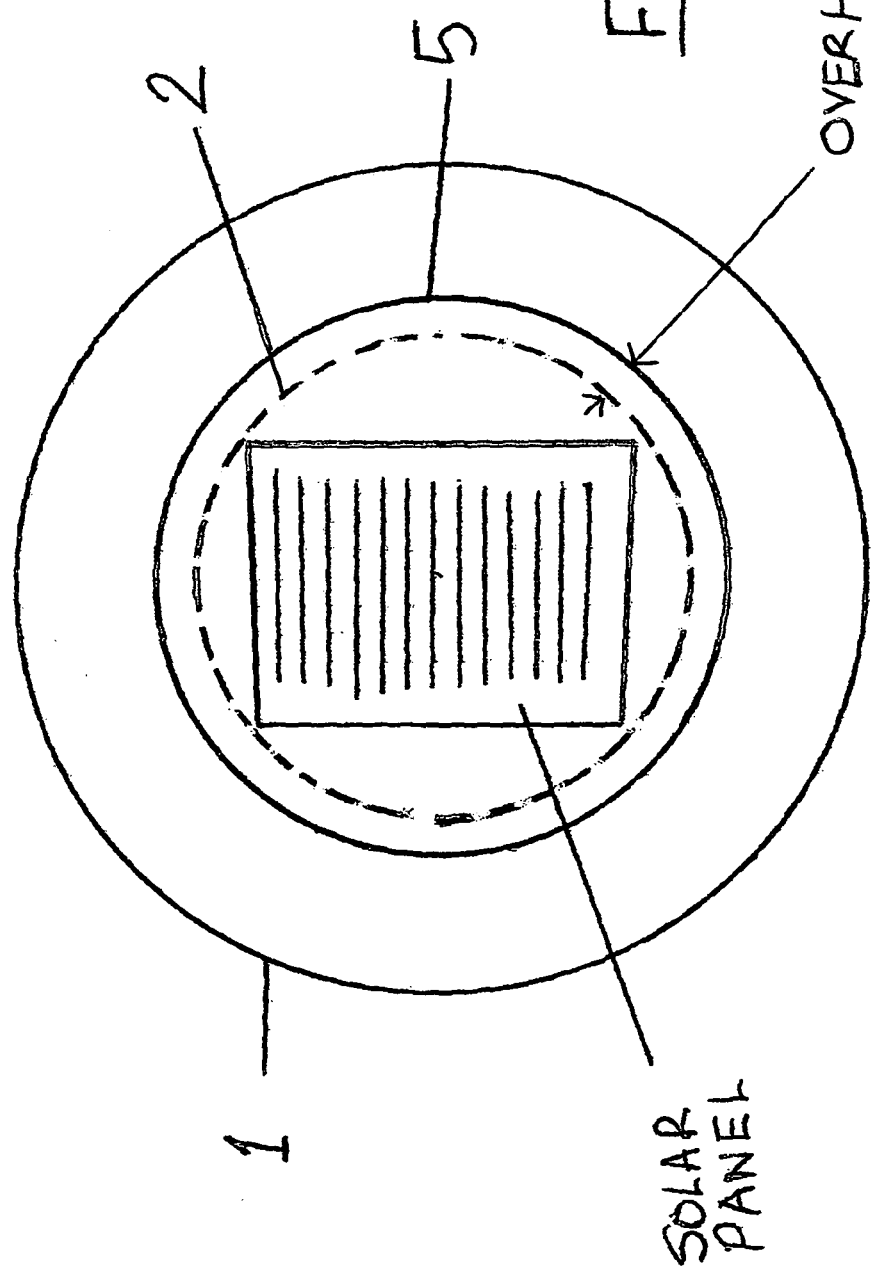

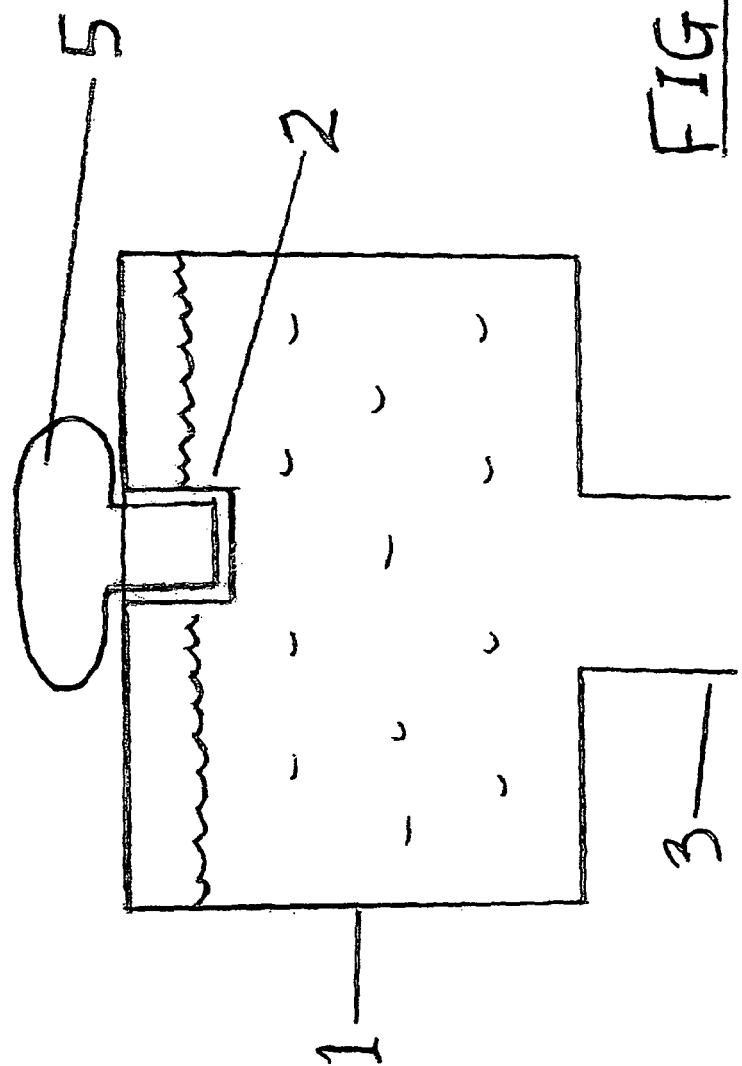

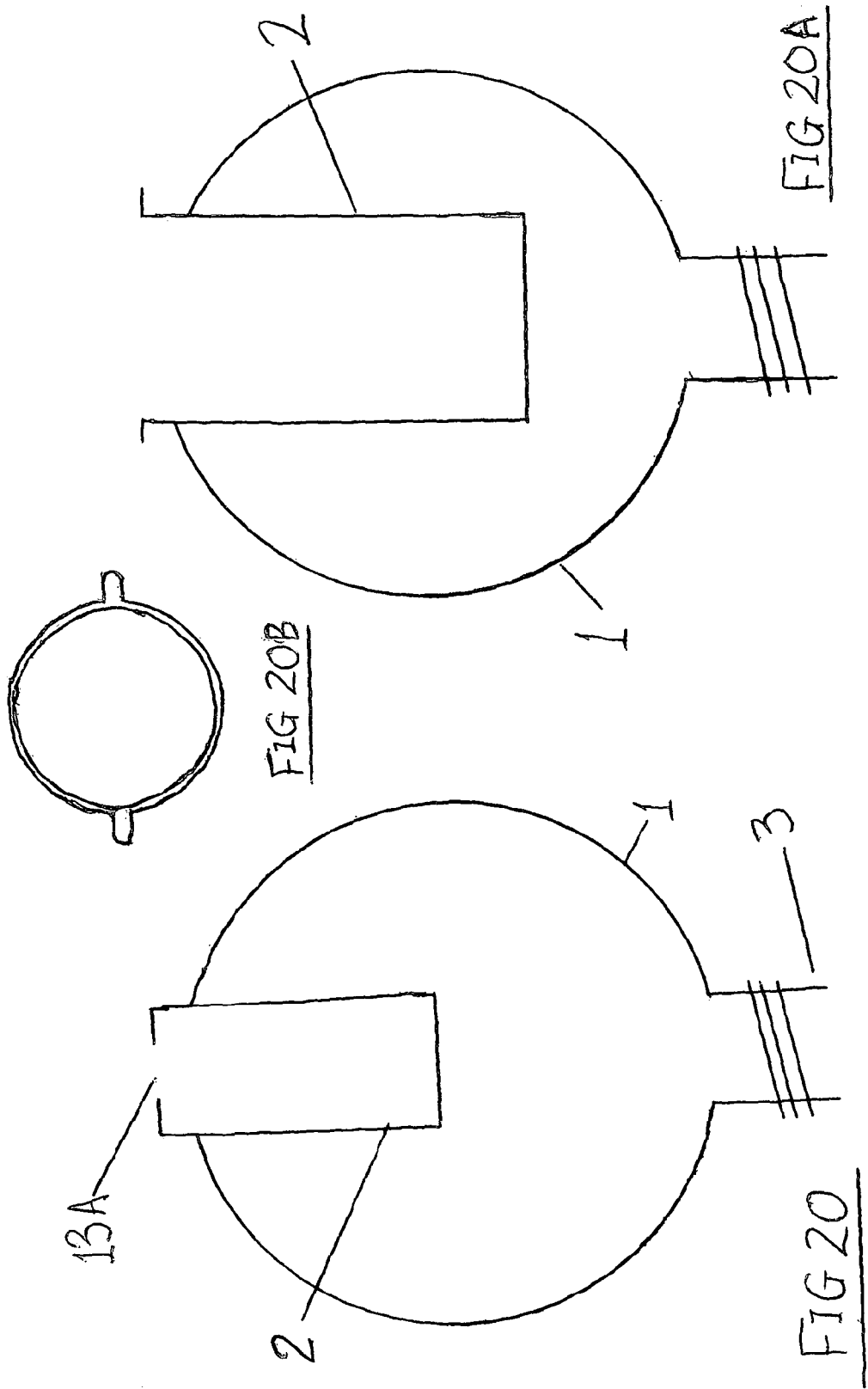

WATERING DEVICE INCORPORATING A LIGHT SOURCE

BACKGROUND

For many years people have taken pride in their gardens and in products to beautify and bring out the best from them not only from the methods of cultivation employed, but also in showing off the garden to its potential.

A well looked after and presented garden provides a little sanctuary or haven where people can relax and unwind after a hard day's work. This has become increasingly important in the difficult economic times we all face.

In order to keep one's precious plants alive when one goes on holiday, many use automatic watering systems. These vary from fully automated electronic systems using sprinklers to drip feed systems using a reservoir, usually in the form of an inverted container which uses gravity and a watering spike to drip feed plants over a period of time.

As living space becomes scarcer, most people are not able to afford the luxury of a large garden, but may have to make use of smaller spaces such as balconies or window ledges.

The present invention extends the current know-how relating to the use of reservoirs in conjunction with drip feed systems by incorporating a lighting system in a unique and innovative way in order to enable the plants to be illuminated in low light, whilst providing a supply of feed to the drip feed device feeding the plant. Thus a dual purpose is served through the practical supply of feed to a drip feed device which feeds the plant and the illumination of the plants in low light allowing the garden to be used or enjoyed after dark.

The invention is very useful for pot plants, but can also be used in gardens.

The invention also encourages use of energy conservation techniques already attained in the field of garden lighting such as solar lamp posts, floating lights and LED lights amongst many others.

Prior art in the same field of technology as the current invention relates to a novelty Christmas Tree Self Watering Ornament, patent number U.S. Pat. No. 5,054,236 A which seeks to use a fibre optic cable and a light source to illuminate a coiled delivery conduit attached to a reservoir.

The present invention differs from U.S. Pat. No. 5,054,236 A in that the invention does not light up the drip feeding portion of the unit (or watering spike that may be used with the reservoir), but is focused on illuminating the reservoir itself. In the present invention the watering spike (which is to be used with the reservoir) in normal use is located partially or wholly underground and so there would be no reason to provide illumination to the drip feed portion of the present invention.

Other prior art relates to US2007/0147024 A1 pertaining to a "Soft Handle with a Lighting Apparatus" and U.S. Pat. No. 7,082,714 B1 pertaining to a "Light Vase". Both of these inventions seek to provide illumination by means of a light source contained in an inner chamber with transparent walls which illuminates a surrounding outer chamber filled with fluid.

The present invention differs from US2007/0147024 A1 which relates to the illumination of an umbrella handle in the sense that US2007/0147024 A1 is not a system for watering plants. Additionally the light source in US2007/0147024 A1 is permanently located within the inner chamber, whereas the light source in the present invention is removable and may be partially as well as wholly contained in the inner chamber.

The present invention differs from U.S. Pat. No. 7,082,714 B1 which relates to a system for illuminating a vase, in the sense that the vase cannot be operated in an inverted position (as can the present invention), since all the water will empty from the vase. The inner chamber of the vase cannot be formed from an indentation of the exterior chamber. If the inner chamber were formed from an indentation made from the bottom of the vase projecting upwards, this would prevent the heat generated from the lighted candle (light source) from being dissipated as the top of the indentation may be closed (as in the present invention).

In addition the pictures clearly show that inner and outer chambers are two separate chambers lying in situ, one within the other, since at the point where the inner and outer chambers meet (namely at the base) there is no access to the inner chamber. Instead the base is flat (not indented or opened to an inner chamber) to enable the vase to stand and to enable the light source to stand unaided within the inner chamber). Both chambers are also of a similar height and the outer chamber does not fully contain or envelop the inner chamber as the latter protrudes above the outer chamber.

Additionally in U.S. Pat. No. 7,082,714 B1 the liquid in the vase, is not supplying a drip feed to plants and the plants are actually located in the reservoir of the vase. The present invention is a device that is separate from the plants that are fed from its reservoir. The plants are not planted or located in the reservoir.

The Watering device incorporating a light source thus seeks to solve the problem posed by numerous objects being inserted in the soil around plants by reducing the number of such objects and to extend what is currently known in this field of technology by incorporating at least one light source partially or wholly within one or more chambers attached to the exterior of a reservoir, the chamber(s) extending inwardly into the reservoir interior, the reservoir in normal use providing a supply of liquid to a watering spike or drip feed device for feeding plants, said light source being releasably or permanently attached within the inner chamber and said inner chamber(s) being permanently or releasably attached to the reservoir.

In this way the need to have separate lights to illuminate the plants is negated. Thus a dual purpose is served through the practical feeding of the plant and the illumination of the plants in low light allowing the garden to be used or enjoyed after dark.

STATEMENT OF INVENTION

A Watering device incorporating a light source which; comprises an enclosed reservoir having an exterior surface and an open mouth which in use is to be attached to a drip feed device or watering spike, and at least one chamber for holding at least one light source, characterized in that the exterior surface of the reservoir has at least one further opening, the or each said opening being attached around its boundary to a wall of the or each chamber, a portion of the or each chamber extending inwardly to the interior of the reservoir, each chamber having a hole to to enable access to the interior of the chamber The scope of the invention is defined by the appended claims.

ADVANTAGES

The advantages of this invention are fivefold:

1) Firstly it enhances the beauty of the garden by converting the liquid reservoir into a light source which not only illuminates the plant, but also the reservoir itself, thus accenting the water or liquid feed as it drains into the soil via the drip feed device.

2) Secondly it reduces the number of articles being inserted in the soil around the plant by combining a reservoir used to supply liquid to a drip feed device or watering spike with a light, such as a solar lamp post, into one unit.

3) In the preferred embodiment of this invention the size, shape and depth of the inner chamber formed from the inwardly projecting or inwardly extending indentation on or inner chamber attached to the exterior of the reservoir can be varied or made so as to accommodate many forms of garden lighting, such as solar lights and led lights (or even floating lights if the inner chamber is partially filled with liquid to provide a medium for floating lights to be used). Any other form of design shape, size, colour, materials etc. or combinations of such may be used for the inner chamber, outer chamber or reservoir and light source to achieve the current invention.

4) The unique relationship between the inner and outer chambers means that access to the light source when the unit is in normal use is almost instantaneous, enabling the light source to be changed or maintained rapidly.

5) As stated above, the invention is very useful for pot plants, and the variety of light sources that may be used can include light sources with an alternating current supply (e.g. LED lights) as well as direct current. This means that the period of time that a user can enjoy the Watering device incorporating a light source is not limited by the time required to deplete the batteries charged by the sun for instance, as would be the case for a Watering device incorporating a light source using a solar lamp as a light source.

To this end a rechargeable solar lamp, as a light source, with an electrical circuit which enables an alternating current or external direct current supply to also be used would be a particularly practical light source when used in a domestic setting such as on a window ledge inside a dwelling. This light source would allow use of the solar cells to store energy during the day for use after dark, but allows the alternating current or external direct current supply to be used to power the light source when the solar energy stored up in the batteries is depleted. LED candles could also be employed as a light source.

In normal use, that is when in an inverted position, the most appropriate description of the invention would be to compare the Watering device incorporating a light source to a light bulb, where the filament is the inner chamber containing the light source and the outer chamber or reservoir is the light bulb itself.

Some examples of the invention will now be described with reference to the accompanying drawings.

FIG. 1

Front View of a Watering device incorporating a light source in use with a watering spike and solar lamp post.

FIG. 2

A Watering device incorporating a light source where the light source is a floating light and the inner chamber is shallow to illustrate the employment of a hole and plug at the floor of the inner chamber.

FIG. 2A

A Watering device incorporating a light source wherein the light source is a floating light and the inner chamber is deep or tall to enable the use of the floating light and inner chamber as a water level indication system.

FIG. 3

Plan view of a Watering device incorporating a light source showing possible relative positioning of the inner chamber with respect to a solar light head.

FIG. 4

Front view of a Watering device incorporating a light source of an alternative shape wherein the light source protrudes significantly above the open end of the inner chamber.

FIG. 5

Front view of a Watering device incorporating a light source wherein the inner chamber is partially threaded near its upper end and this threading has been used to secure a threaded solar light source partially within the inner chamber.

FIG. 6

Front view of a Watering device incorporating a light source showing a non-linear shaped inner chamber.

FIG. 7

Front view of a Watering device incorporating a light source showing a complex shaped inner chamber with multiple light sources

FIG. 8

Front view of a Watering device incorporating a light source showing multiple inner chambers.

FIG. 9

Front view of a Watering device incorporating a light source showing a plug or cap supporting a light source in the inner chamber

FIG. 10

Cross sectional view of a Watering device incorporating a light source showing a vertical member support near the bottom of the inner chamber supporting a light source with a matching hole.

FIG. 11

Cross sectional view of a Watering device incorporating a light source showing a threaded vertical member support near the bottom of the inner chamber supporting a light source with a matching threaded hole.

FIG. 12

Cross sectional view of a Watering device incorporating a light source showing the vertical member support attached to the light source in situ with a matching hole near the bottom of the inner chamber.

FIG. 13

Cross sectional view of a Watering device incorporating a light source with a secondary protruding neck and mouth which is internally threaded.

FIG. 14

Cross sectional view of a Watering device incorporating a light source showing a secondary neck and mouth which is internally threaded holding in place a removable inner chamber by means of a matching thread at the top of the removable inner chamber.

FIG. 15

Cross sectional view of a Watering device incorporating a light source showing a secondary neck and mouth which is internally threaded holding in place a removable inner chamber which is formed from the light casing.

FIG. 16

Cross sectional view of a Watering device incorporating a light source showing an inner chamber which contains a thread around its inner circumference, the end of the inner chamber located within the reservoir being open or lacking a floor.

FIG. 17

Cross sectional view of a Watering device incorporating a light source showing an inner chamber which contains a thread around its inside circumference, the end of the inner chamber located within the reservoir lacking a floor, said inner chamber being extended by means of the attachment of a removable inner chamber the outer and inner surfaces of said removable inner chamber being threaded in part to receive a threaded cap.

FIG. 18

Cross sectional view of a Watering device incorporating a light source showing an inner chamber which contains a thread around its inside circumference, the end of the inner chamber located within the reservoir lacking a floor, said inner chamber being extended by attachment of a removable inner chamber formed from a light casing.

FIG. 19

Cross sectional view of a Watering device incorporating a light source wherein the thickness of the reservoir walls is sufficient to accommodate threading to enable the inner chamber to be attached by means of screw threads to the reservoir.

FIG. 19A

Cross sectional view of a Watering device incorporating a light source wherein the inner chamber and the opening at the exterior surface are of a different cross section.

FIG. 20

Cross sectional view of a Watering device incorporating a light source wherein the hole in the inner chamber wall that is located at the exterior of the reservoir or that projects outwardly is partially opened.

FIG. 20A

Cross sectional view of a Watering device incorporating a light source wherein an inner chamber has been permanently attached to the reservoir and has specially adapted protruding members for attaching to a solar light head.

FIG. 20B

Cross sectional view showing a plan view of a light casing from FIG. 20A, that is to be used in the Watering device incorporating a light source.

DESCRIPTION

The Watering device incorporating a light source is designed to be used with a drip feed device or watering spike 4 as per the accompanying drawings. The reference to openings in the exterior of the reservoir in the description to follow excludes the mouth 3 of the reservoir, unless specifically stated otherwise.

For notation purposes, the use of the phrase "end of the chamber" when describing the inner chamber 2 is in relation to the drawings where the assumption is made that the inner chamber 2 is of a uniform cross section and is located in a substantially vertical position when the device is in use (see FIGS. 1-5, 9-20, 20A). Thus the top of the inner chamber is usually referencing the end of the chamber that is located at or outside the exterior of the reservoir 1. The bottom of the inner chamber 2 is referencing the end that is usually located inside the reservoir 1.

If the inner chamber 2 was attached to an opening 13 close to the mouth 3, so that the inner chamber 2 projected inwardly of the reservoir 1, but in an upwards direction, then the terms top and bottom of the chamber 2 may be less appropriate as just described and their spatial position in relation to the exterior of the reservoir 1 would be more appropriate.

Figure 6:
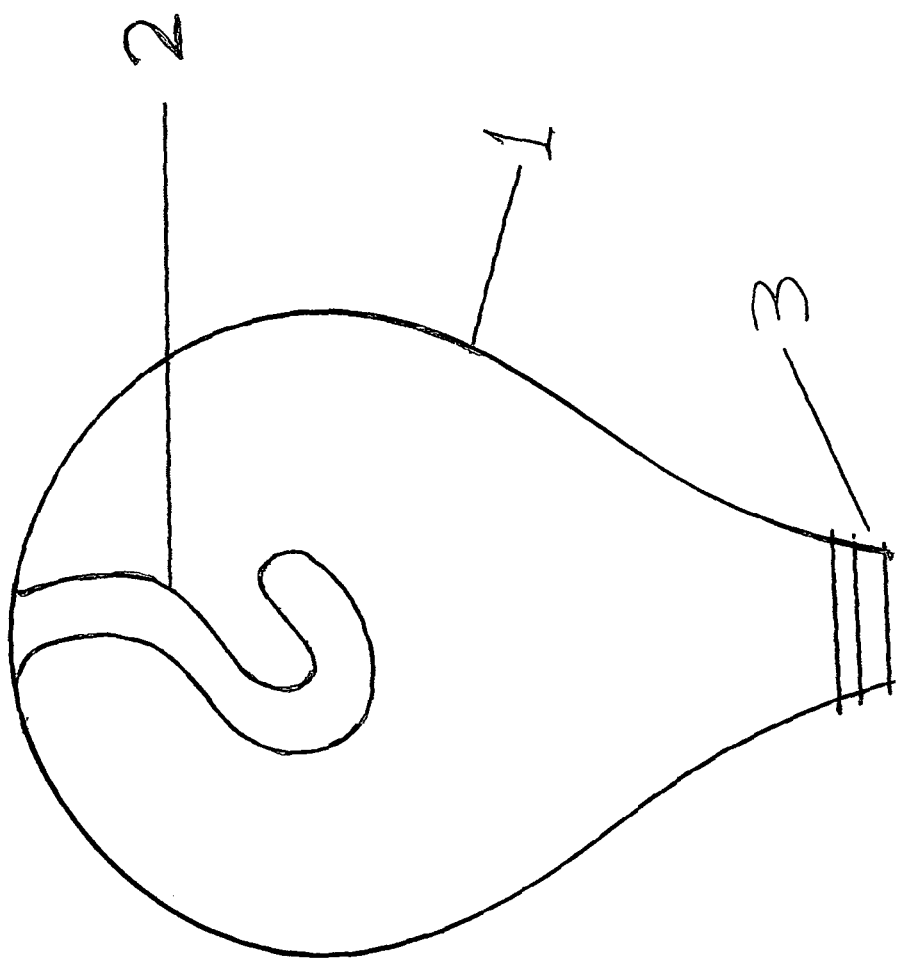
Figure 7:
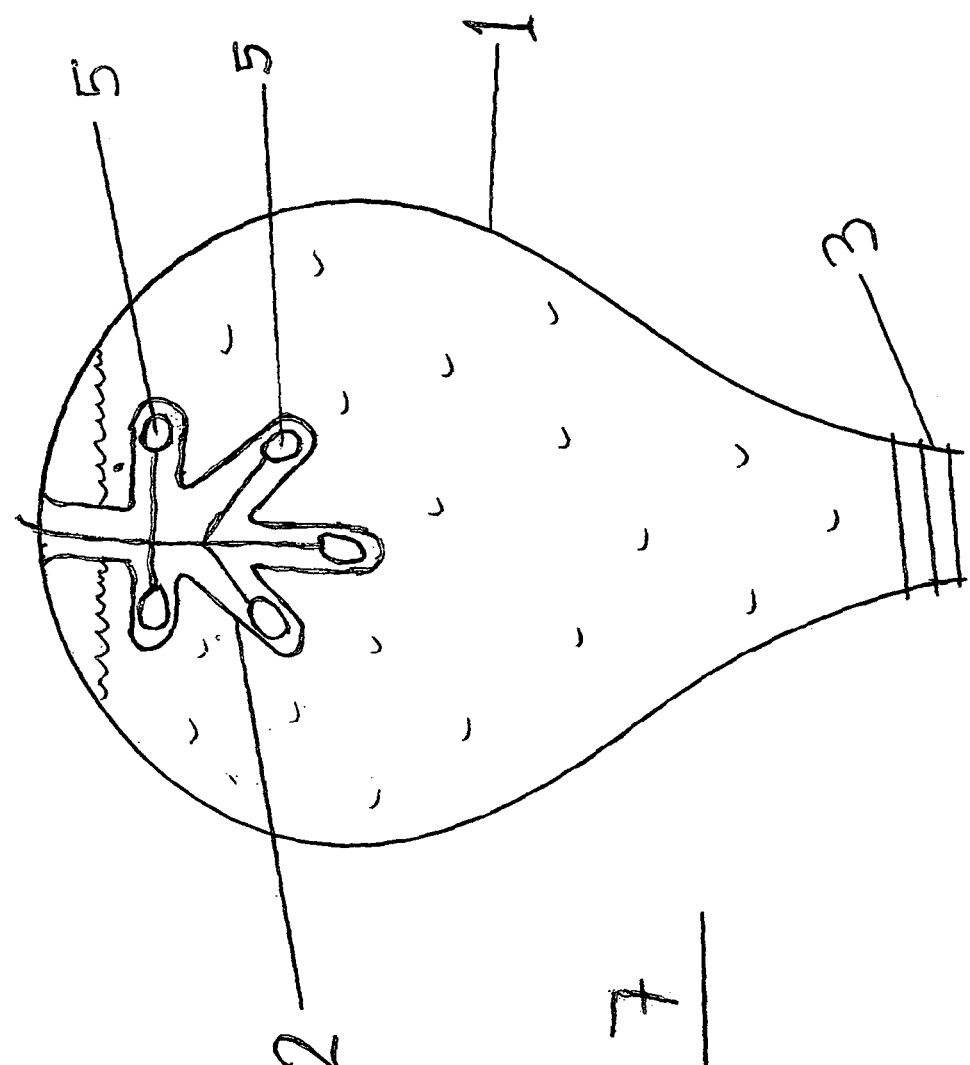
Figure 8:
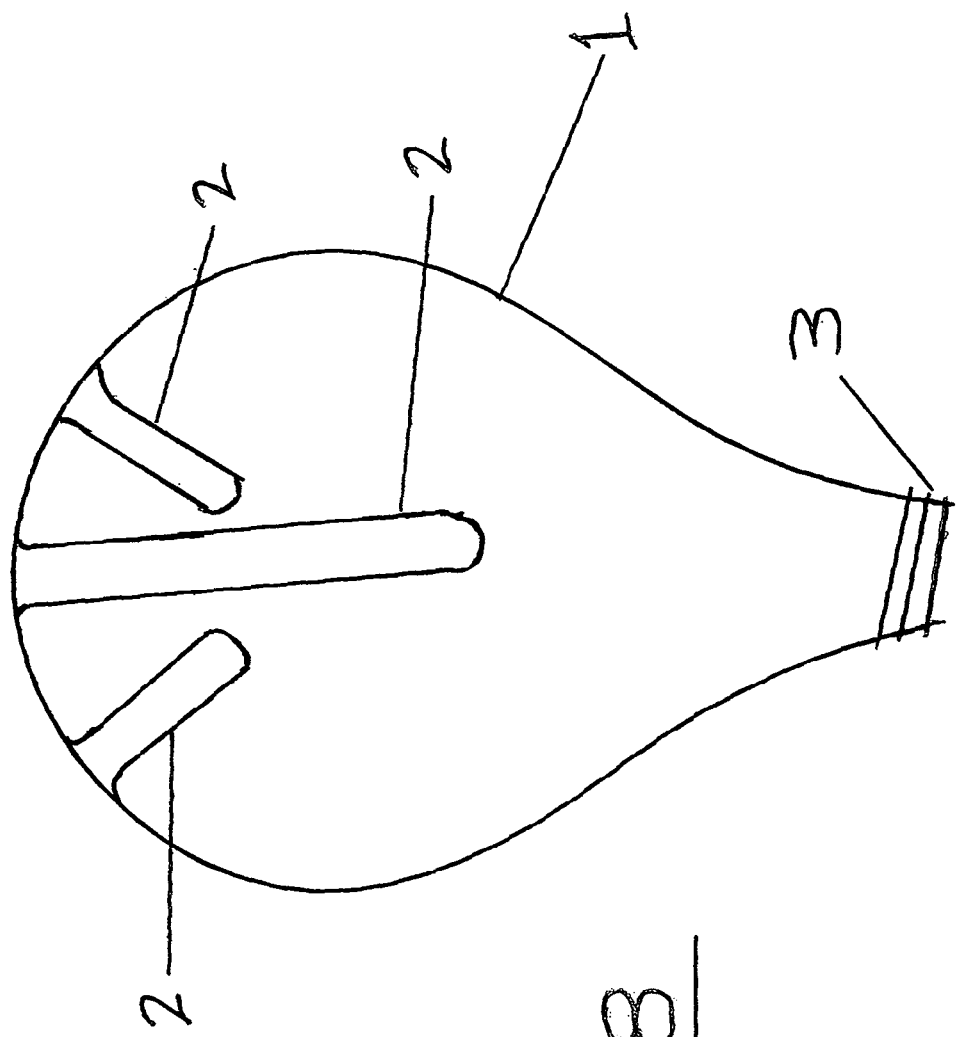
Figure 9:
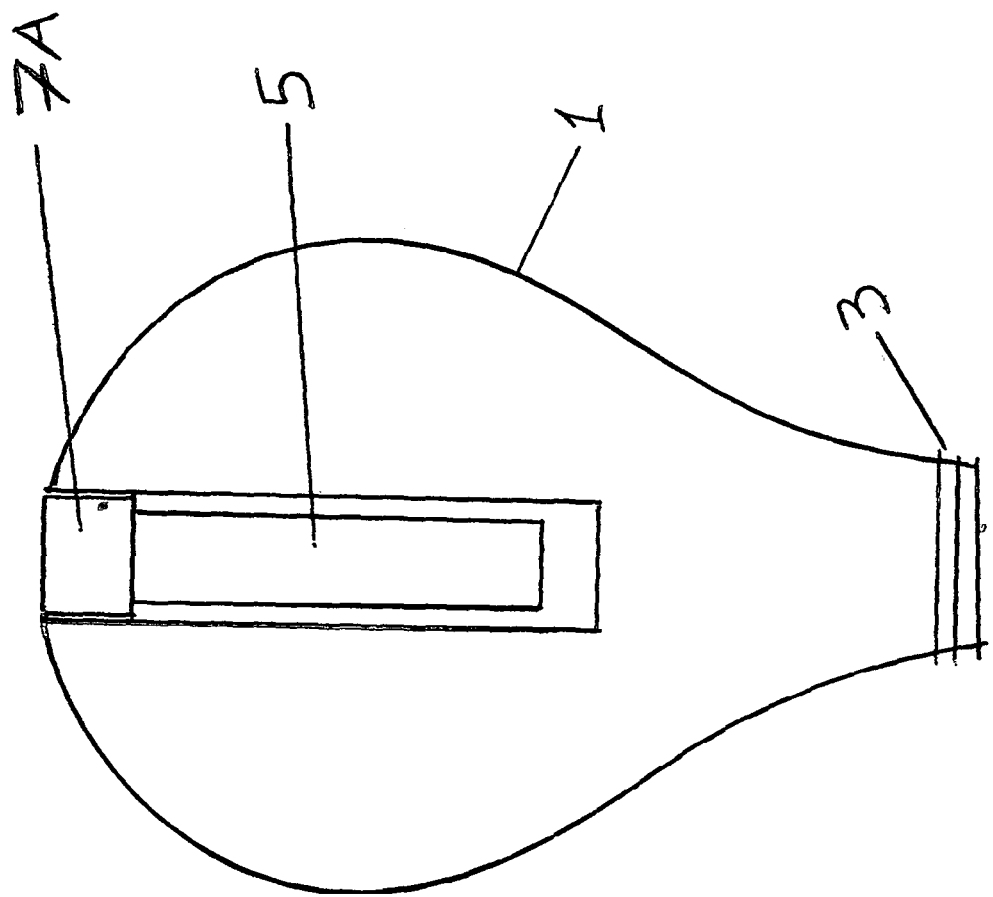

This latter description is also more appropriate when the shape of the inner chamber 2 is complex and does not have an easily identifiable top or bottom (see FIGS. 6-8).

The reservoir 1 can be of any shape but will normally be transparent or translucent or a mixture of the two in order to allow the light or part thereof from the light source 5 partially or wholly contained in the inner chamber 2 to be observed.

The inner chamber 2 may be formed from an indentation on the exterior of the reservoir 1 which projects inwardly or extends inwardly to the interior of the outer chamber or reservoir 1. The extent to which this inner chamber 2 extends inside the outer chamber or reservoir 1 will vary depending on design and application. This method of formation thus assumes a permanent attachment of the inner chamber 2 to the exterior surface of the reservoir 1.

The inner chamber may also be formed by inserting a chamber partially (FIGS. 20, 20A) or wholly (FIGS. 1, 2, 4, 5, 6, 7, 8, 9, 10, 11, 12, 14, 17, 19, 19A) into an opening 13 (FIGS. 13 & 16) in the exterior surface of the reservoir 1, the opening 13 having a matching cross sectional shape (although not a mandatory requirement see FIG. 19A) to the chamber 1. The chamber 1 wall is then attached at each place it meets the boundary of the opening 13 by welding or threaded connections (on both connecting surfaces) or other means which may be permanent (FIGS. 1,2, 4-12) or releasable (FIGS. 13 to 19).

To enable a light source 5 to be inserted into the inner chamber 2, said inner chamber 2 is normally open (that is, it contains a hole or opening 13A) at the end or portion which is located either at (FIGS. 1, 2, 4, 5, 6, 7, 8, 9, 10, 11, 12, 14, 17, 19A) or which extends outwardly from (FIGS. 19, 20, 20A) the exterior of the reservoir 1. It has been assumed that the hole or opening 13A occupies the whole cross-section of the inner chamber 2, but this is not a mandatory requirement (see FIG. 20). This open end 13A, of the inner chamber 2 thus substantially occupies the same spatial position as the opening 13 which was closed by the attachment of the inner chamber 2 to the reservoir 1. Opening 13 is thus an opening in the exterior of the reservoir 1 and opening 13A is substantially the same spatial opening, but its depth and range is now limited to the inner chamber 2. Thus opening 13A could be referred to as the access to an indentation in the exterior of the reservoir 1, when the inner chamber 2 is in situ with the reservoir 1 (that is, when attached to the exterior surface of the reservoir 1 as described), since it provides access to an inward extension of the exterior surface of the reservoir 1.

In the preferred embodiment of the invention (FIG. 5), the end of the inner chamber 2, which is located inside the reservoir 1 is also usually sealed or closed. However other embodiments may exhibit a partially or fully opened end 13B. (See FIGS. 2 & 2A). The hole 13B in the inner chamber 2 is related to the hole 13 in the reservoir 1 surface. The walls and floor of the inner chamber 2 when attached to the exterior surface of the reservoir 1 become like an indented exterior surface of the reservoir 1. Since the preferred embodiment illustrates a vertically oriented inner chamber 2 of uniform cross-section, any hole 13B made in the floor of the inner chamber 2 will occupy a portion of the hole 13 when the device is viewed from above (plan view). The hole, 13B thus appears to be an indentation or vertical displacement of part or all of hole 13 (depending on the size of 13B).

However when the design is different to the preferred embodiment and any of the configurations relating to orientation, cross-section and shape of the inner chamber is different, then the assumptions made regarding the relationship between the holes 13 and 13B may not fully apply. (For instance if the inner chamber 2 is non-linear in shape then the hole 13B will still be a displacement of a portion of the hole 13, but not necessarily vertically.

The effect thus produced to an observer of the preferred embodiment is a chamber 2 substantially located inside the reservoir 1 which appears to be formed from an indentation in the exterior surface of the reservoir 1.

If the inner chamber 2 is formed from an indentation of the exterior surface, then of course hole 13 would never exist.

The above therefore illustrates that the inner chamber 2 can be permanently (FIGS. 1,2 4-12, 19A, 20, 20A) as well as releasably (FIGS. 13-19) attached to the reservoir 1.

The preferred embodiment of the invention (FIG. 5) is also additionally characterised by the employment of screw threads around the circumference of the inside walls of the inner chamber 2 to enable a light source 5, (in the case of FIG. 5 a solar light) which is threaded around the exterior circumference of the light casing to enable the light 5 to be screwed into the inner chamber 2. It is also to be noted that the light casing can be much shallower in height than illustrated. This would of course result in savings in fabrication costs. Also the versatility of the preferred embodiment is also evident in the use of any light source 5 that has a matching thread to that in the inner chamber 2. In fact the use of only the head of a threaded light source (with the bulb exposed) would negate the need for the light casing as the inner chamber 2 would protect the bulb from the contents of the reservoir 1.

Figure 5:
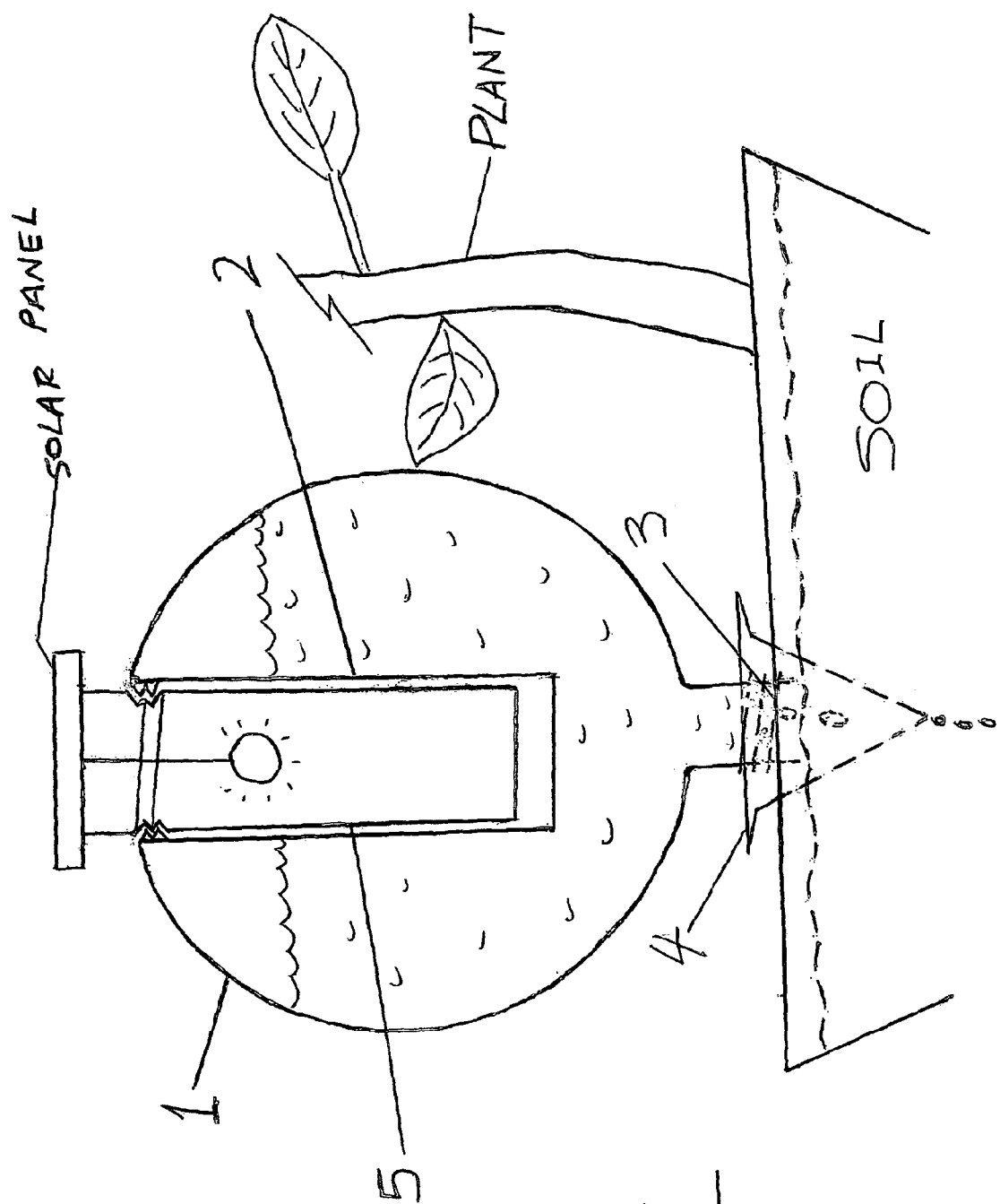
Figure 17:
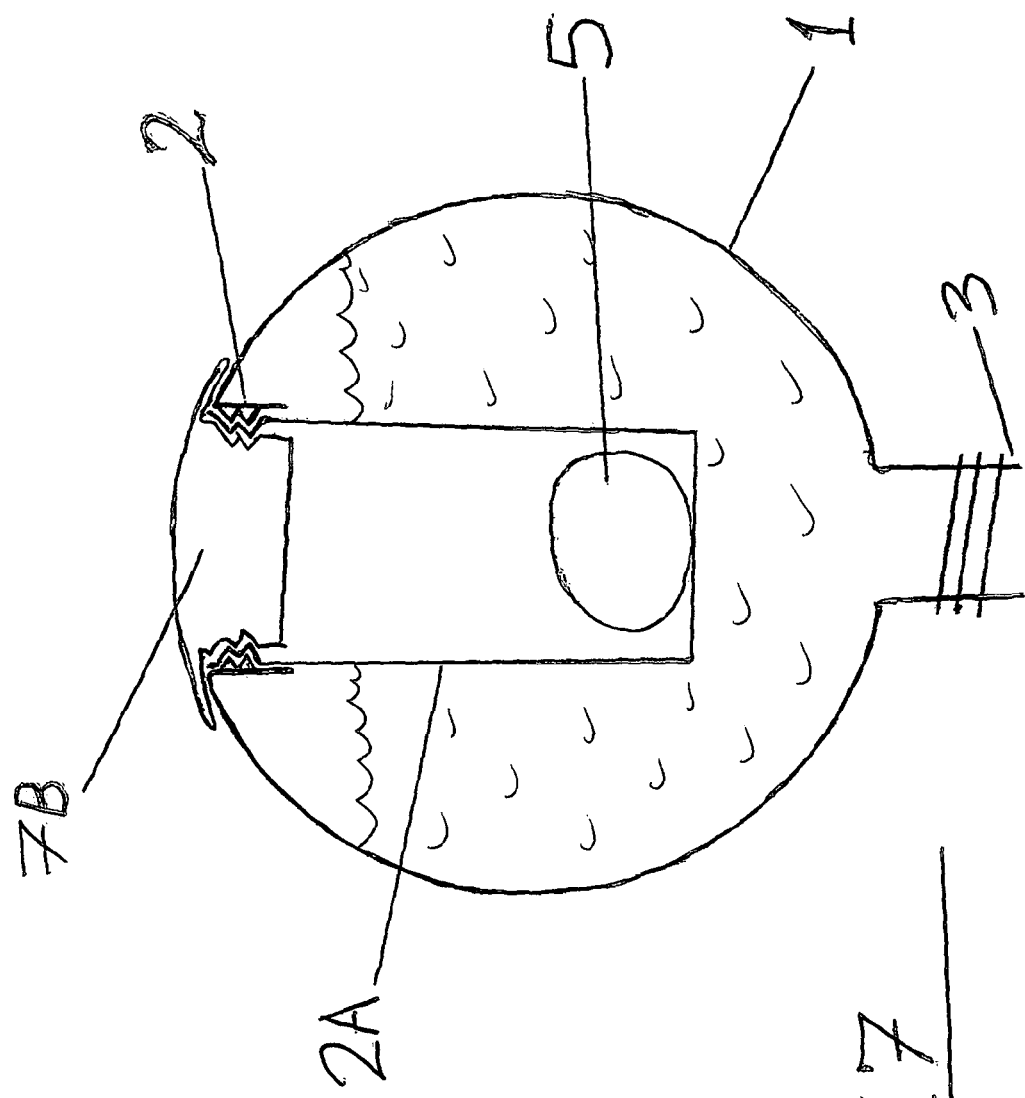

Additionally, as one of the objectives of this invention is to utilise varied light sources 5 depending on user taste and application, it is also possible to remove the threaded solar light 5 (FIG. 5) and place another light source such as an LED candle inside the inner chamber 2 and protect this light source 5 (if it is not weatherproof) by screwing a weatherproof cap 7B into the open end of the inner chamber 13A (FIG. 17). FIG. 17 illustrates this with a removable inner chamber 2, but a permanently connected inner chamber 2 as illustrated in FIG. 5, can easily be so adapted.

Thus the preferred embodiment (FIG. 5) of the invention is seen to demonstrate versatility in enabling the user to choose not only the type of light source 5 to be used, but also the duration during which the device should be illuminated. (LED candles can be rechargeable and can last for many hours on a single charge as opposed to solar lights which might fail depending on sunshine received after only a few hours).

The reservoir 1 normally has a threaded outlet or mouth 3 to enable it as per other proprietary reservoirs in common use to be secured or screwed to any commercially available watering spike 4. However this may not be necessary if alternative means of securing the mouth 3 to drip feed devices is employed. FIG. 4 shows an unthreaded mouth 3.

Any other suitable means (whether releasable or permanent) may be employed apart from a threaded mouth to secure or attach the reservoir to the watering spike 4.

The size of the outer chamber or reservoir 1 is such as to enable sufficient water to be contained and drip fed via a drip feed device or watering spike 4 for a reasonable period of time. The larger the outer chamber or reservoir 1 the greater the volume of water held and thus the longer the time before the reservoir 1 empties.

The rate of water egress from the outer chamber or reservoir 1 is controlled by the watering spike 4 and this will also affect the period of time taken to empty the outer chamber or reservoir 1.

As the figures show the inner chamber 2 can be any shape and size (see FIGS. 1, 2, 2A, 5, 6, 7 & 8) and can project or extend significantly into the interior of the reservoir 1 as in FIGS. 1, 8-12, 14, 15, 17 & 18 or project or extend less into the interior of the outer chamber or reservoir 1 as in FIGS. 2, 4, 7 & 8 or project outwardly of the exterior surface (FIGS. 14, 15, 20, 20A). However the inner chamber 2 is normally sized and shaped such as to enable a light source 5 to be fully or partially contained within it, whilst remaining sealed or separated from the contents or liquid in the reservoir 1. However there are exceptions to this rule.

The floor of the inner chamber 2 will normally be sealed and will also usually be the portion of the inner chamber 2 that extends furthest into the interior of the reservoir 1 (see assumptions for preferred embodiment). However there are exceptions and one of these would be where the design of the inner chamber 2 is not a straight projection or extension toward the interior of the outer chamber or reservoir 1, but follows a non-linear path such as a spiral, resulting in the direction of the inner chamber 2, for instance returning back toward the exterior surface of the reservoir 1, see FIG. 6.

In addition consumer requirements may result in the design of more complex shapes for the inner chamber 2 see FIG. 7 which shows an inner chamber 2 with multiple secondary chambers which have branched off from the original.

Although the bottom of the inner chamber 2 is normally sealed from the contents of the reservoir 1, this is not a prerequisite.

For instance a floating light 5 could be used in an inner chamber 2 with a sealed end or floor, but can also be used in an inner chamber 2 where a hole 13B (FIG. 2A) is made in the bottom of the inner chamber 2 to allow the liquid in the reservoir 1 to flow into the inner chamber 2, thus providing a medium for the use of the floating lights 5. This hole 13B can be in width up to the size of the horizontal cross section of the inner chamber 2 when the outer chamber or reservoir 1 is in its position of normal use (that is when inverted vertically).

Figure 2:
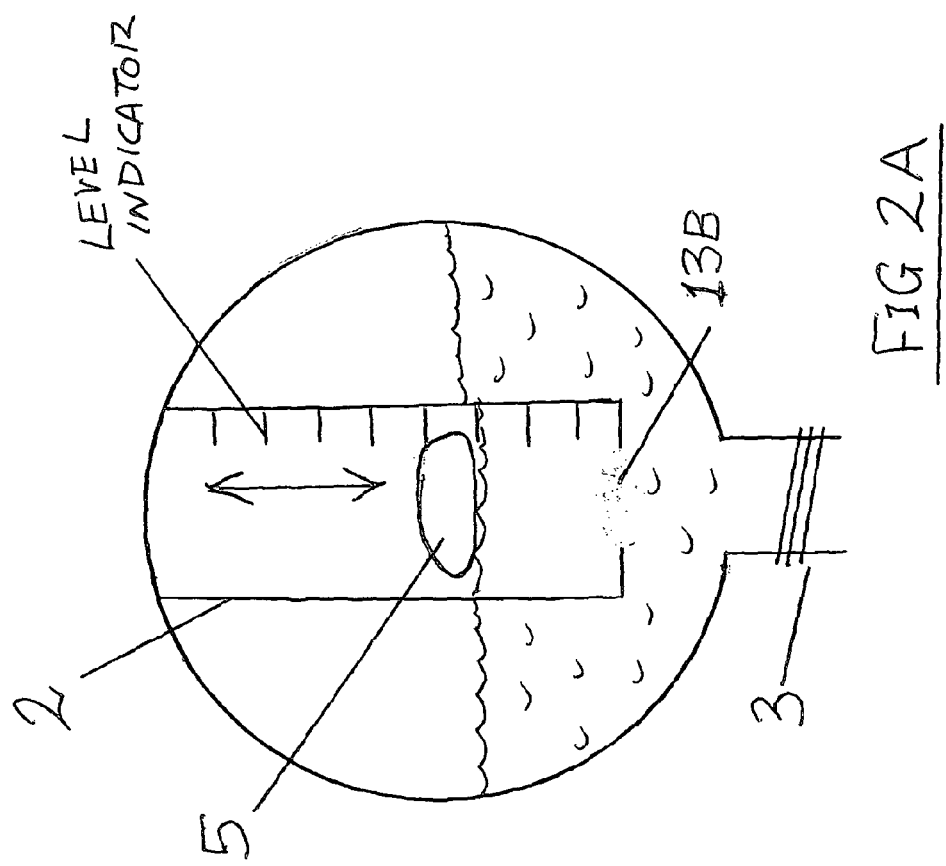
Figure 2A:
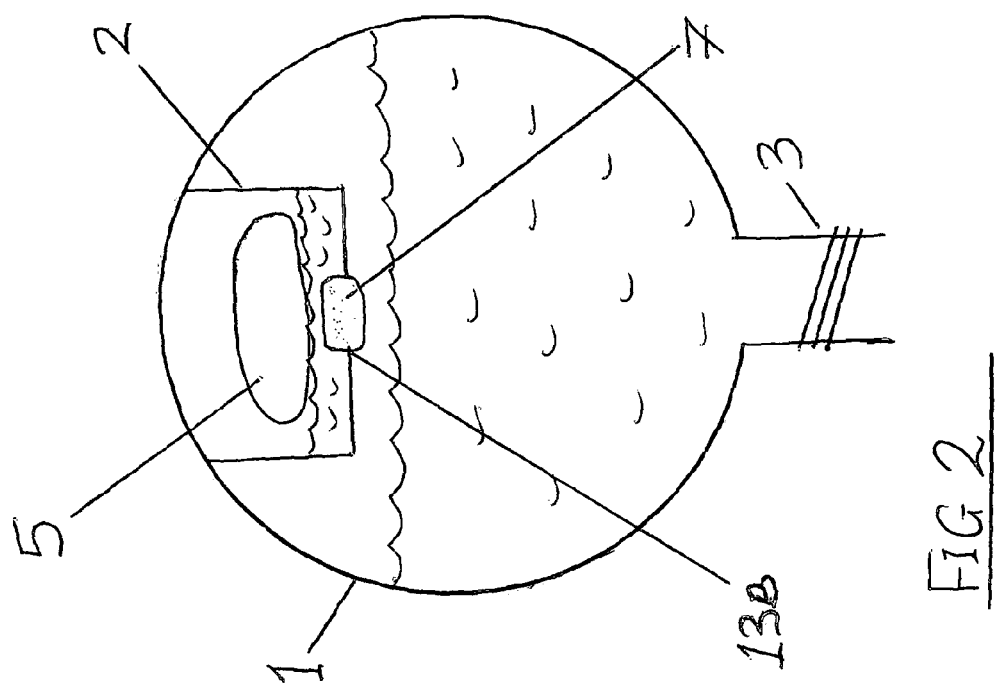

This embodiment may be adapted to use the floating light as a water level indicator (see FIG. 2A). For this to work it may require that the hole 13B is made smaller than the floating lights 5 used in the inner chamber 2 to prevent the light(s) 5 from entering the outer chamber or reservoir 1, when the liquid in the reservoir 1 falls below the level of the bottom of the inner chamber 2. It may also require that the inner chamber 2 is much deeper to enable the indication for refilling (i.e. when the floating lights 5 are no longer in contact with the water) to reflect more accurately the amount of liquid left in the outer chamber or reservoir 1.

Another approach, if due to design requirements the inner chamber 2 is not to be permanently sealed from the outer chamber or reservoir 1, is to provide a plug 7 to seal the hole, 13B at the bottom of the inner chamber 2 (see FIG. 2). This method also has the advantage of enabling the outer chamber or reservoir 1 to be refilled whilst in its position of normal use that is, when in an inverted position or orientation.

Once the reservoir or outer chamber 1 is adequately filled, the plug 7 can then be inserted into the hole, 13B to seal off the contents of the outer chamber or reservoir 1 from the contents of the inner chamber 2. However the use of such a plug 7 is optional as the light source 5 chosen may not require the bottom of the inner chamber 2 to be sealed. Or design considerations may require that the bottom of the inner chamber 2 be left unsealed (see FIGS. 16 to 18).

It is also worth noting that if the floating light(s) 5 is not being used as a water level indicator, the use of a hole 13B with a plug 7 may be more suitable for more shallow inner chambers 2 as the plug 7 will be more accessible to a finger inserted into the inner chamber 2, although design considerations may dictate otherwise if a suitable means for attaching and removing the plug 7 from the hole 13B of a deep inner chamber 2 can be employed.

Any other light source 5 in addition to floating lights could also be employed as the plug 7 effectively provides an optional seal between the contents of the reservoir 1 and the contents of the inner chamber 2.

Design requirements may also dictate the provision of additional holes in the walls of the inner chamber to allow the liquid in the reservoir 1 to enter the inner chamber 2, in addition to or instead of the hole 13B.

It is also to be noted that instead of a single hole 13B described above, any number of holes 13B in the floor of the inner chamber 2 could be made and these would fulfil a similar function to a single hole 13B.

The most common way to use the light source 5 is to insert it into the inner chamber 2 and gravity and the walls and sides of the inner chamber 2 should provide adequate support for normal use (see FIGS. 1 and 4).

If the light source 5 used is loose or needs to be stabilised whilst located partially or wholly within the inner chamber 2, then suitable securing or supporting means can be employed to enable this to occur.

Suitable supporting means could include rubber or plastic bands or supporting strips (not illustrated) made from a suitable substrate that could be attached or wrapped (releasably or permanently) around a part of the light source 5 (e.g. around the exterior circumference of a light source 5 with a circular cross section) before insertion into the inner chamber 2 to provide a snug fit or support by friction against the walls of the inner chamber 2. Any other shape or cross section for the light source 5 may be employed.

Alternatively, the supporting strips may be secured (via permanent or releasable means) around a portion of the inside walls of the inner chamber 2 to ensure a snug fit or support by friction when the light source 5 is inserted into it.

For solar lamps 5, the over-hang of the head containing the solar cell unto the exterior side of the outer chamber or reservoir 1, would act as a brace or support which would enable the solar light 5 in the inner chamber 2 to be suspended if necessary (see FIG. 3), although the vertical length of the light 5 might be such as to negate this (for instance, if the light source 5 is only partially housed within the inner chamber 2).

Other solar light 5 designs (not illustrated) such as those in a solar bottle lamp are also usable in the inner chamber 2. In this instance the solar panel and battery assembly would be located at the bottom of the inner chamber 2. The attached LED light 5 is attached on top of the solar panel and sunlight entering the reservoir 1 and inner chamber 2 is captured by the upward facing solar panel which in turn powers the LED light 5 after dark. This configuration may not be waterproof and so will require protection of the solar panel and battery assembly from the elements using a cap or top 7B (FIG. 17).

Another alternative means of supporting or securing the light source(s) 5 within the inner chamber 2 is to use a plug or cap 7A (FIG. 9), to which the light source 5 is attached and which is of a similar cross-section to the width of the inner chamber 2, thus allowing the chamber 2 to be sealed (partially or wholly) with the light source(s) 5 inside and protected from the elements. The plug or cap 7A may be releasably or permanently attached to the inner chamber 2 and or to the light source(s) 5.

The plug or cap 7A to which the light source 5 is attached may be fashioned similarly to the cap or top 7B which is not attached to a light source 5 (FIG. 17) by employing a screw thread to seal off the inner chamber 2 from the elements or it may be made without a thread causing it to rely on friction (as already stated) or the overhang of a head (if so designed) unto the sides of the reservoir or outer chamber 1 to support itself and the attached light source 5. However any other type of plug or cap 7A to which a light source or light sources 5 is/are attached may be employed to ensure adequate support of the light source(s) 5 when located in the inner chamber 2.

As already referred to, an alternative arrangement where the light source 5 does not need to be attached to the plug or cap 7A is illustrated in FIG. 17. A cap or top 7B is employed merely to seal the light source 5 inside the inner chamber 2. As FIG. 17 shows, this cap 7B has a screw thread around its external circumference that enters the inner chamber 2 and an overhanging head that follows the contour of the exterior of the outer chamber or reservoir 1. Part or all of the vertical height of the portion of the top or cap 7B which enters the inner chamber may be threaded, although the number of revolutions of the thread around the circumference of the cap should be such as to ensure that it is firmly in place when screwed into the inner chamber 2. The inside wall circumference of the inner chamber 2 is threaded and the number of revolutions of the thread around the circumference matching the threads on the top or cap 7B so that they can be screwed together securely. A particularly attractive option is to fashion the cap or top 7B from a translucent or transparent material to enable the light from the inner chamber 2 to radiate vertically upwards as well as sideways. However the material used may vary depending on design requirements.

Any other means to design a cap 7B which is releasably attached to the inner chamber in order to seal the contents of the inner chamber 2 from the elements may be employed.

Figure 10:
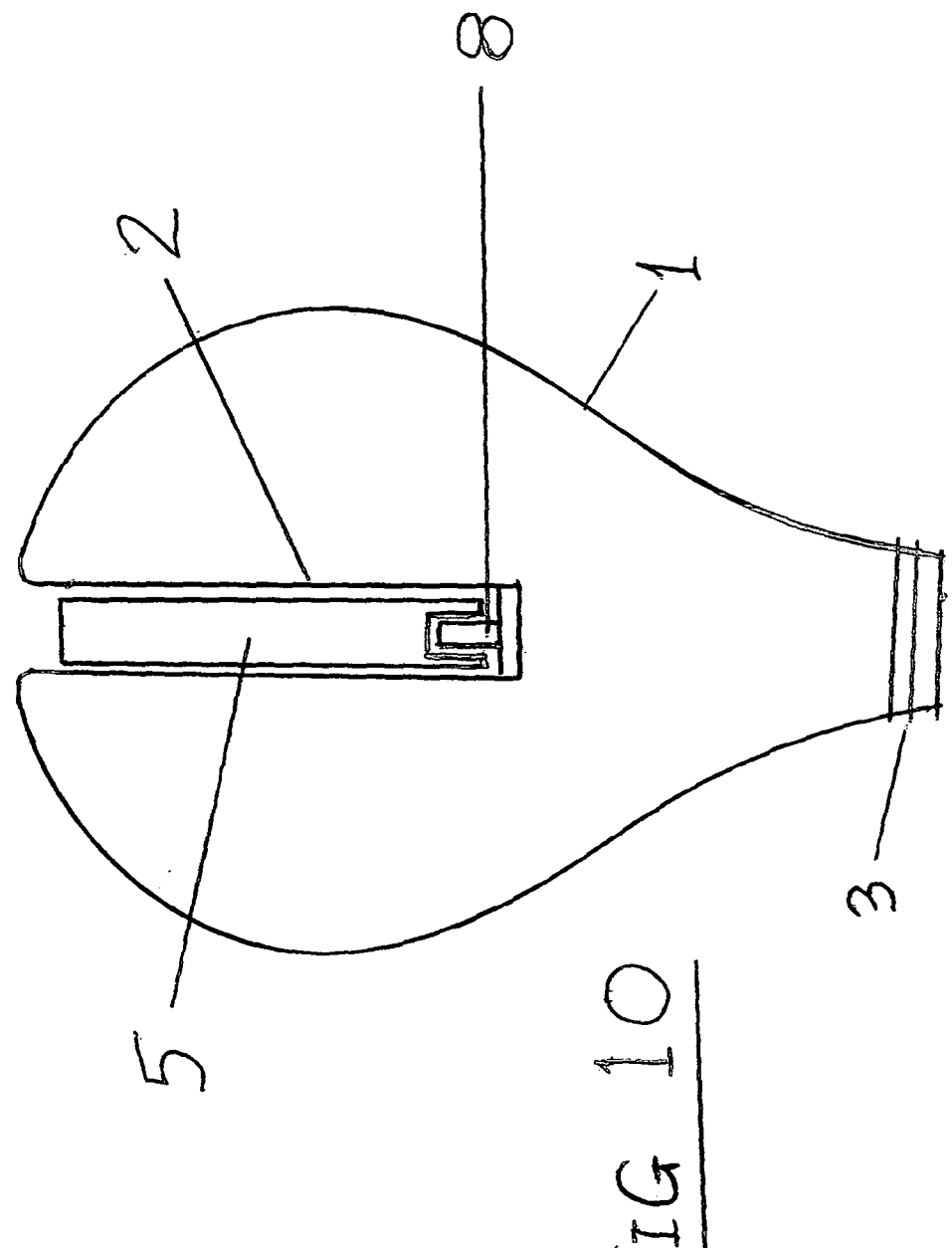
Figure 11:
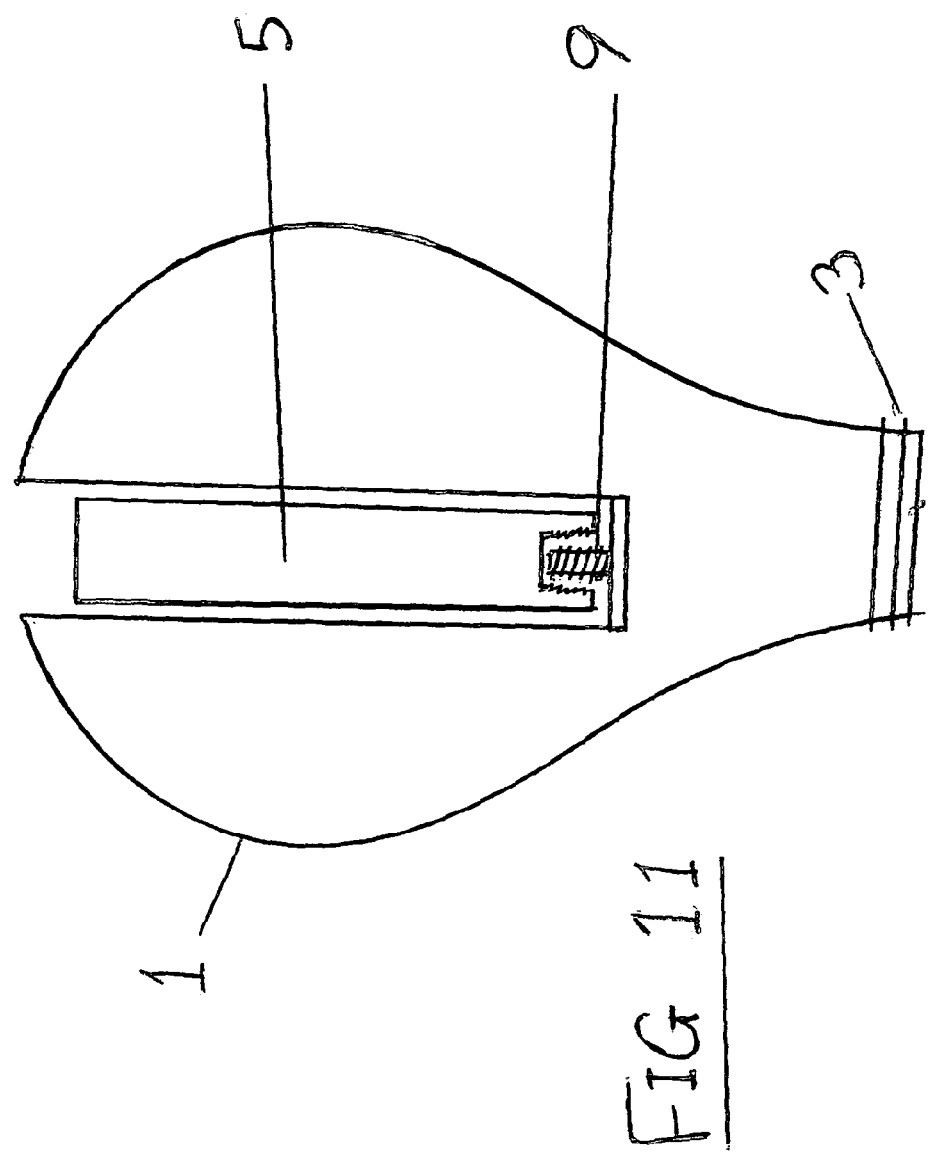

Another means to support or secure the light source 5 in place is to locate a vertical member 8 near the floor of the inner chamber 2 with a suitably designed light source 5 containing a hole/recess or indentation at its base that is able to receive the vertical member 8 (see FIG. 10). The vertical member 8 may be supported on an insert or platform near the bottom of the inner chamber 2 or the vertical member 8 could be a part of the inner chamber 2 (e.g. formed from the moulding, extrusion etc. process used to form the reservoir). Alternatively the vertical member 8 may be attached permanently or releasably to the inner chamber 2 by any other suitable means.

Any other means to locate the vertical member at the bottom of the inner chamber 2 may be employed.

Another means to support or secure the light source 5 inside the inner chamber 2 which is a variant of, but a more robust version of, the supporting means just described is to provide a screw thread on the vertical member 9. The light source 5 also has a threaded hole or threaded indentation at its base to receive the threaded vertical member 9 (see FIG. 11). Attachment is thus made by means of a screwing action.

Figure 12:
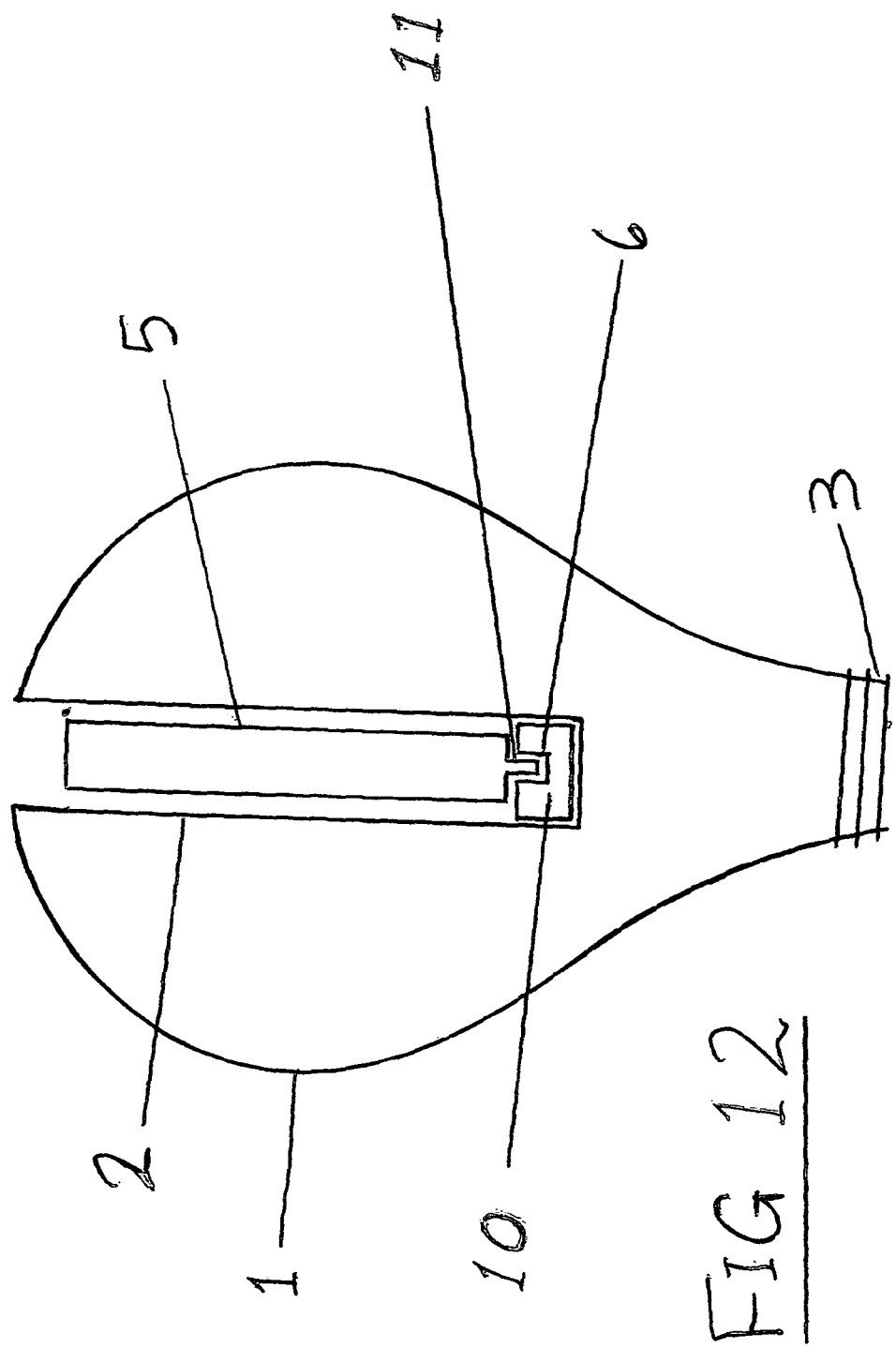
Figure 13:
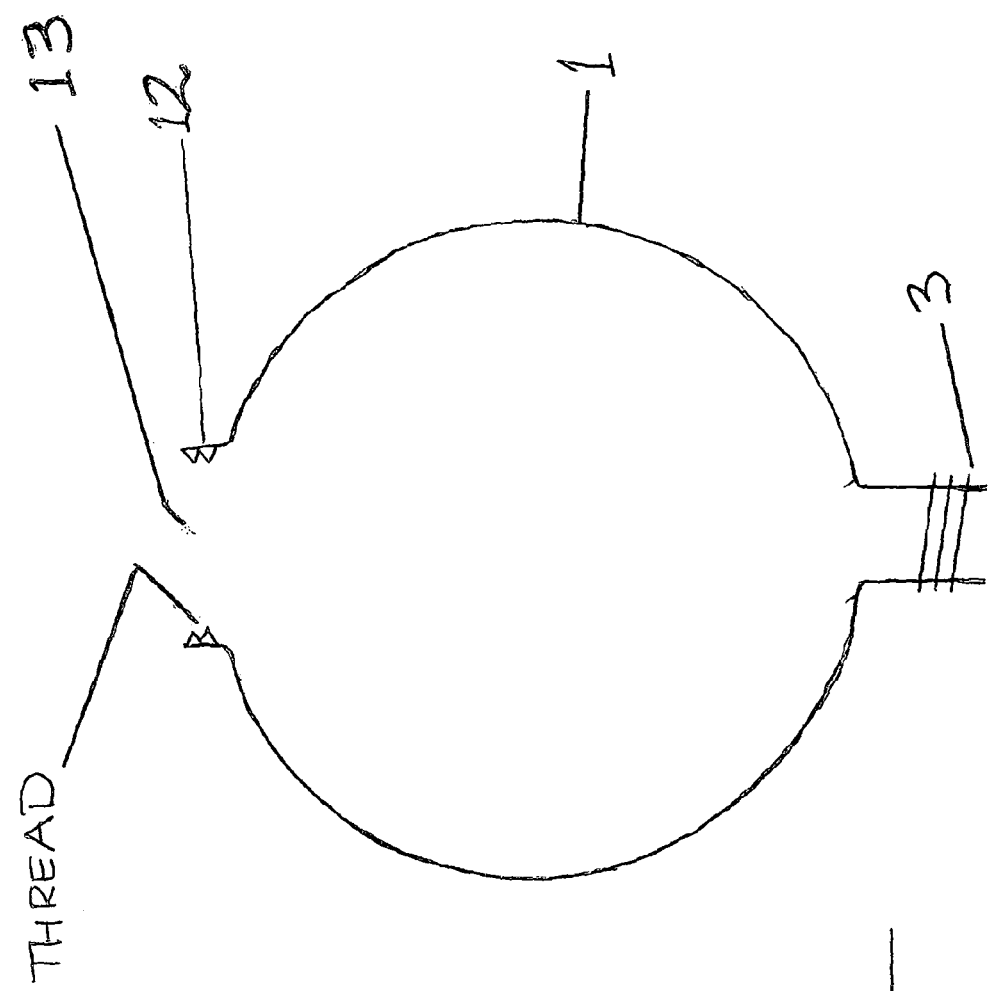

Of course the use of these threaded or unthreaded vertical members on or near the base of the inner chamber 2 and receiving holes on the light sources 5 could also be reversed (see FIG. 12). A suitable insert or platform 10 near the bottom of the inner chamber 2 containing a hole 6 may itself be threaded around part of the inner circumference of the hole 6 or unthreaded to receive a vertical member 11 located at the bottom of a light source 5, the vertical member 11 being unthreaded (11) or threaded (not illustrated) to suit the hole type 6 in the insert 10.

Any other means of providing suitable support to a light source or light sources 5 partially or wholly located in the inner chamber(s) 2 of a reservoir 1 may also be employed.

The preferred embodiment is illustrated in FIG. 5 and shows a particularly typical variant of the invention where the inside wall circumference of the inner chamber 2 is threaded (the number of revolutions of the threading around the inside wall of the inner chamber being such as to ensure a firm hold between the inner chamber 2 and any suitably threaded object that is screwed into it). This allows a light source 5 with a matching thread around the circumference of its exterior dimension to be screwed into the inner chamber 2. Thus the threading in the inner chamber 2 acts a supporting means for the light source 5.

It is also to be noted that in any of the figures illustrated and described, the bottom portion or floor of the inner chamber 2 could be designed so as to contain a hole 13B with a plug 7 (see FIG. 2), to give the option of sealing the light source 5 from the contents of the reservoir 1, after refilling the outer chamber or reservoir 2 through the hole 13B, for example. As mentioned, the hole, 13B can be any size up to and including the horizontal cross section of the inner chamber 2 when the reservoir 1 is in its position of normal use (that is when inverted vertically as illustrated).

Figure 16:
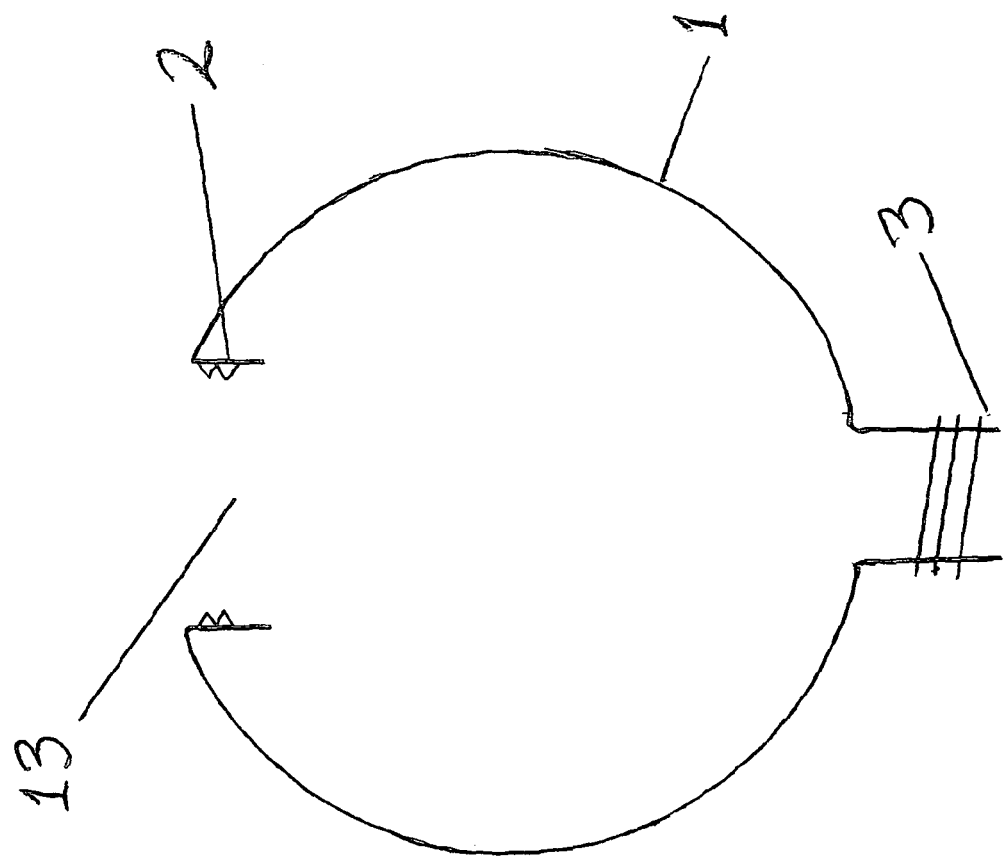

If the bottom of the inner chamber 2 is fully removed and the inside wall circumference of the inner chamber 2 is threaded (the number of revolutions of the threading around the inside wall of the inner chamber being such as to ensure a firm hold between it and any similarly threaded object screwed into it), then the Watering device incorporating a light source may look like the illustration in FIG. 16.

FIG. 16 has an inner chamber 2 that is deliberately shallow. The reason for this is to enable a separate, longer and removable inner chamber 2A to be attached to the shallow, bottomless inner chamber 2. This removable inner chamber 2A has a matching thread around the circumference of its exterior dimension near its top end to enable it to be screwed into the more shallow inner chamber 2, resulting in an inner chamber that extends deeper into the interior of the outer chamber or reservoir 1 (see FIG. 17). This embodiment may have advantages relating to a simpler design of the Watering device incorporating a light source for manufacturing purposes.

Figure 18:
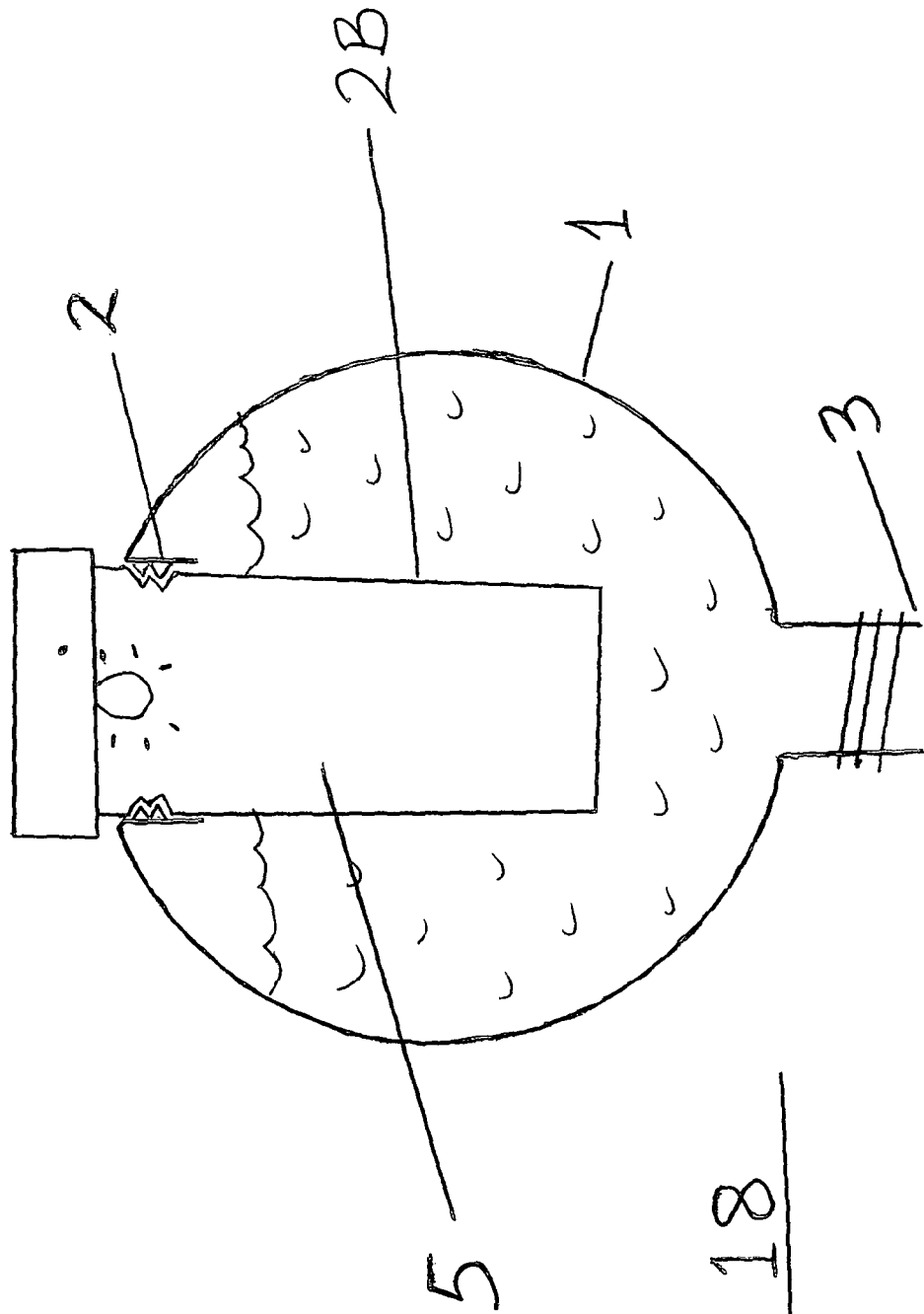
Figure 19A:
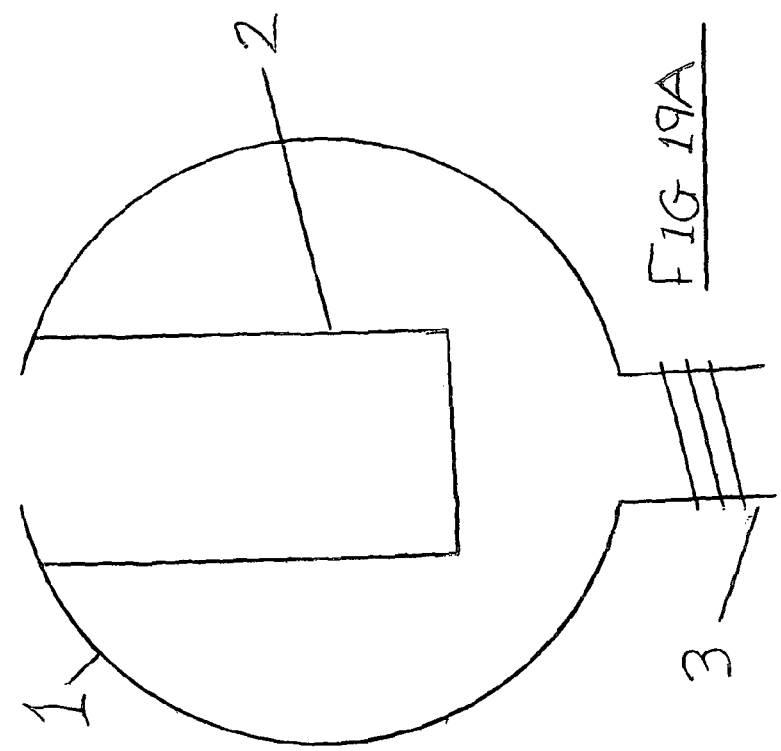

To reduce the amount of material used in the manufacture of the Watering device incorporating a light source, the inner chamber 2 mentioned in FIG. 16 could be extended using the casing 2B of a suitable light source 5 (see FIG. 18). The casing of the light source 5 has a matching thread around the circumference of its exterior dimension near its top end to enable it to be screwed into the relatively shallow inner chamber 2, resulting in an inner chamber that extends deeper into the interior of the outer chamber or reservoir 1 (see FIG. 18).

The disadvantage of this embodiment just described is that the versatility of use of varying light sources 5, which this invention tries to illustrate, is limited to a single type of light source 5 as the inner chamber 2 (formed from the light casing) is not easily reusable for other light sources 5.

For an even simpler design the Watering device incorporating a light source may contain a secondary neck and mouth 12 the inner wall circumference of the neck of the mouth being threaded (see FIG. 13) (The number of revolutions of the threading around the inside wall of the neck being such as to ensure a firm hold between it and any similarly threaded object screwed into it). This effectively creates 2 mouths; the mouth 3 that attaches to the watering spike 4, and an upper mouth 12. This upper mouth 12 is used to hold an inner chamber 2C.

This removable inner chamber 2C contains screw threading around the circumference of its exterior dimension and is designed to screw into the upper mouth 12. The number of revolutions of the threading around the exterior wall of the inner chamber 2C being such as to ensure a firm hold between it and the mouth 12 when the mouth 12 and inner chamber 2C are screwed together. The result is that the inner chamber 2C becomes located in the interior of the outer chamber or reservoir 1. (See FIG. 14)

More than one additional mouth 12 may be employed due to design resulting in multiple inner chambers 2C.

Once in place the removable inner chambers 2A, 2C act like a permanently attached inner chamber 2, in the sense that they may also be threaded around their inner wall circumference to enable a light source 5 with a matching thread to be supported partially or wholly within their, respective inner chambers (not illustrated).

Figure 14:
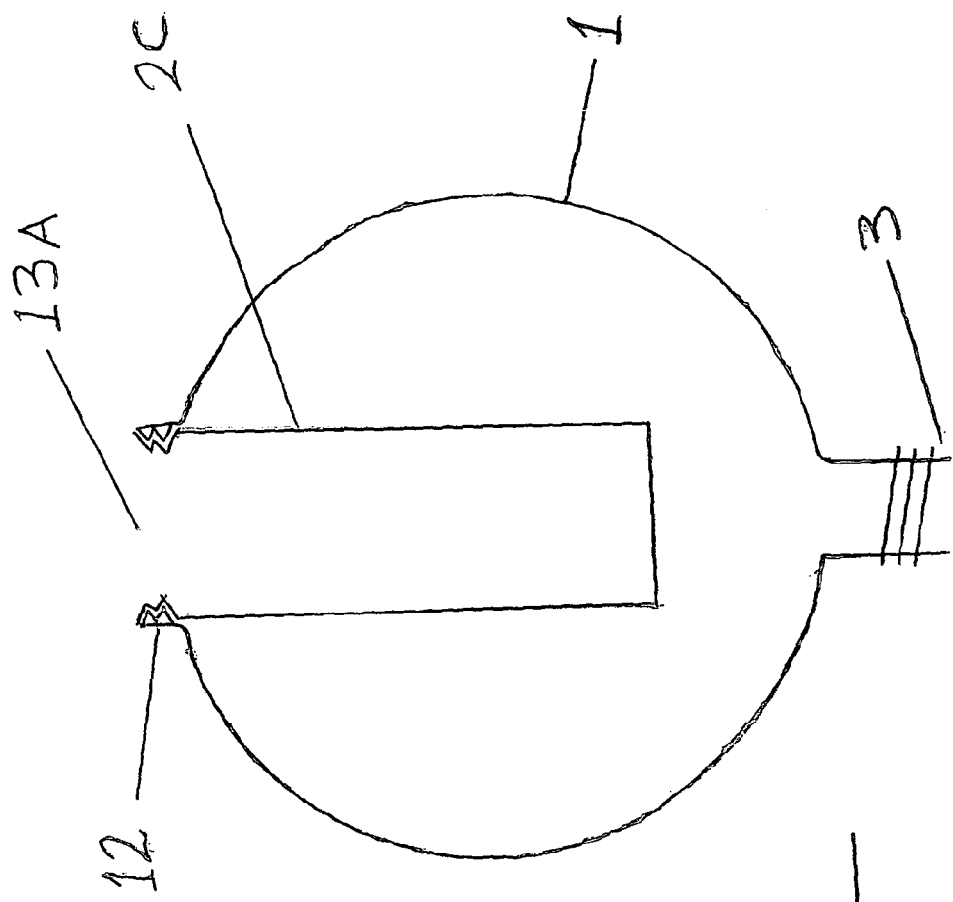
Figure 15:
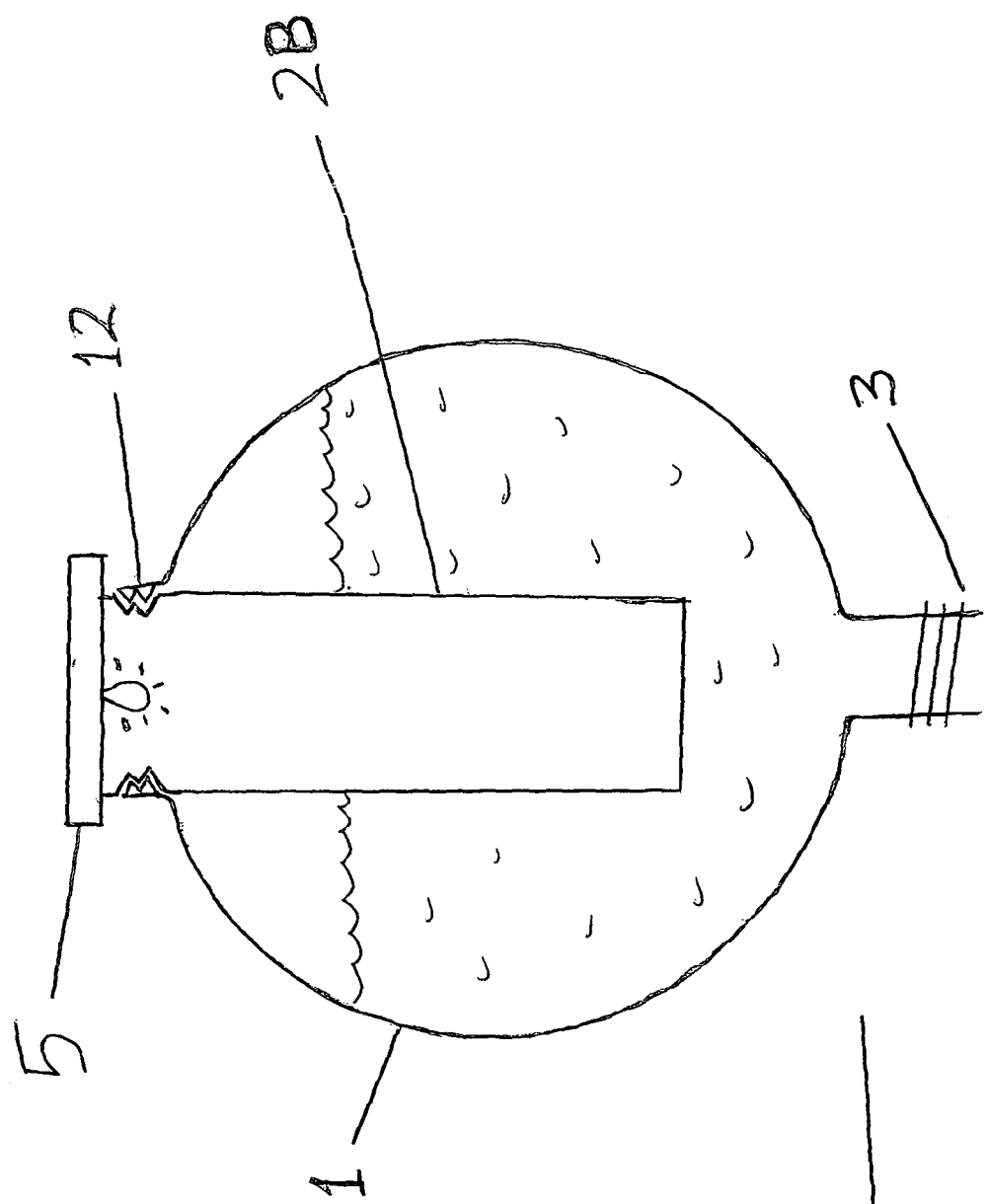

It is also possible to permanently attach the inner chambers 2A and 2C to the openings in FIGS. 14 and 16 by welding or other suitable means (not illustrated)

In fact all the methods for supporting a light source 5 inside the inner chamber 2 described can be employed with the removable inner chambers 2A, 2C.

To reduce the amount of material used in the manufacture of the Watering device incorporating a light source, the upper mouth 12 could be used to form an inner chamber by using the casing 2B of a suitable light source 5 which screws into the upper mouth 12. The casing of the light source 5 has a matching thread around the circumference of its exterior dimension. The number of revolutions of the threading around the inside wall of the neck being such as to ensure a firm hold between it and any part screwed into it). The result when the light casing 2B is screwed into the mouth 12 is an inner chamber 2B that extends into the interior of the outer chamber or reservoir 1 (see FIG. 15).

The disadvantage of this embodiment just described is that the versatility of use of varying light sources 5, which this invention tries to illustrate, is limited to a single type of light source 5 as the inner chamber 2B (formed from the light casing) is not easily reusable for other light sources 5.

The light casing 2B could also be permanently attached to any opening in the reservoir 1, whether formed from an inwardly or outwardly protruding feature on the exterior of the reservoir or just a simple opening in the exterior of the reservoir 1, the simple opening 13 lacking any inwardly extending or outwardly protruding features. This method simplifies manufacture, but can limit the variety of light sources 5 that can be used in the Watering device incorporating a light source. FIG. 20A illustrates this by means of an inner chamber specifically designed for a type of light source 5, such as a solar light head. The protruding members shown in FIG. 20B are designed to twist into a solar light head or any other light source 5 employing this connection means.

Figure 19:
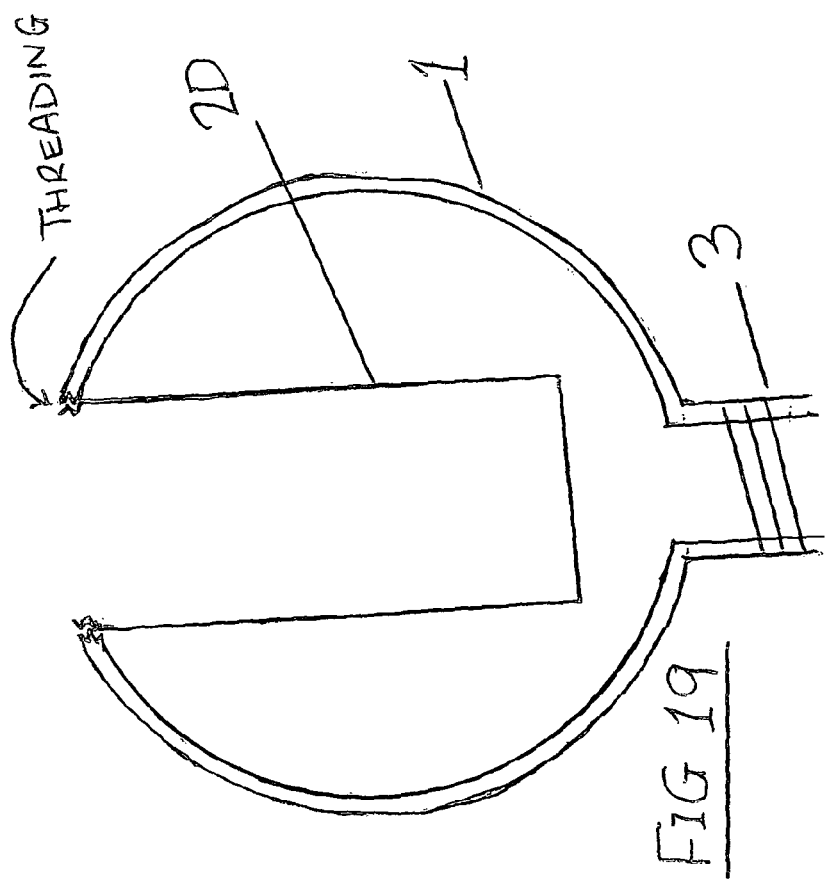

As illustrated in FIG. 19, if the thickness of the wall of the reservoir 1 around the opening 13 in the exterior surface of the reservoir 1, is sufficient to contain threading, then this could also provide a means to attach a removable inner chamber 2D without resorting to a threaded upper mouth 12 or a shallow threaded indentation or inner chamber 2 lacking a floor or bottom (that is avoiding any means that require any inwardly extending or outwardly protruding features around the opening 13 in order to facilitate connection of the inner chamber 2D).

In such a situation a suitably sized opening lacking any inwardly extending or outwardly protruding features 13, but containing threading around the internal circumference or boundary of the opening (it is assumed that the opening is of circular cross section) would be used to secure a suitably threaded inner chamber 2D or light source 5.

Any other suitable means may be employed to releasably or permanently attach an inner chamber 2 to an opening 13 on the outer chamber or reservoir 1 apart from the use of screw threads or welding.

FIG. 8 shows a variation of the invention, wherein multiple inner chambers 2 have been employed.

As per design requirements some or all of these separate inner chambers (FIG. 8) may interconnect (once or multiple times) inside the reservoir or remain separate and distinct or be of varying sizes, shapes, depths etc.

Any combination of the above types of inner chamber (whether permanently or releasably attached) and opening 13 design as mentioned may be employed as required.

The advantage of multiple inner chambers is that more light sources 5 can be put into the reservoir 1 to give a brighter or more intense illumination. In the case of solar lights 5 more energy could be harnessed by multiple solar lights 5 as opposed to one solar light 5.

The material which the reservoir 1 is made from can be glass, plastic or any other type of material that is transparent or translucent.

However if the planting arrangement is such that there is not a need to observe the planting from a certain angle or side, then the reservoir 1 could be opaque in the areas required so that its light source 5 would only be observable from the desired angle. Or if the desire is to channel the light upwards unto the plant, then the reservoir 1 can also be opaque.

Any other reason for using an opaque reservoir 1 may also be employed.

The reservoir 1 may be calibrated to allow a user to determine the maximum amount of water that can be safely used without inhibiting the functioning of the drip feed device or watering spike 4.

A hole 13B and plug 7 may also be employed in any of the above mentioned embodiments as necessary (if not already specifically stated) in order to provide access to the contents of the reservoir 1.

The various means of supporting the light source 5 as described for the inner chamber 2 may also be interchangeably applied to whichever design is used or to any of the other embodiments of the Watering device incorporating a light source described above.

It is assumed that all screw threading mentioned in this description has suitable stop threads where necessary to ensure a secure attachment of the respective parts to one another.

Although it has been assumed for the most part in the description that the inner chamber is of a uniform and circular cross-section, it is to be noted that the inner chamber cross-section can be of any shape as can that of the reservoir. The use of such chambers (whether inner or outer/reservoir) would of course require that alternative means to screw threads are employed to releasably connect the parts described. This would of course apply to the cap 7B and any other part described that employ screw threads.

In some of the above drawings and descriptions, it has been assumed that only one light source is inserted into each inner chamber, however multiple light sources can also be used in each chamber, in any of the cases above where appropriate or due to design or user requirements (FIG. 7).

The invention claimed is:

1. A Watering device incorporating at least one light source which comprises an enclosed reservoir having an exterior surface and an open mouth which in use is to be attached to a drip feed device or watering spike, and at least one chamber for holding at least one light source, characterized in that the exterior surface of the reservoir has at least one further opening, the or each said opening being attached around its boundary to a wall of the or each chamber, a portion of the or each chamber extending inwardly to the interior of the reservoir.

2. A Watering device incorporating at least one light source as claimed in claim 1 wherein the chamber is permanently attached to the reservoir.

3. A Watering device incorporating at least one light source as claimed in claim 2 wherein the chamber is formed from an indentation on the exterior of the reservoir.

4. A Watering device incorporating at least one light source as claimed in claim 1 wherein the chamber is releasably attached to the reservoir.

5. A Watering device incorporating at least one light source as claimed in claim 2 or 4 wherein the light source is attached to the inner chamber.

6. A Watering device incorporating at least one light source as claimed in claim 5 wherein the means of attachment of the light source to the inner chamber is by releasable means.

7. A Watering device incorporating at least one light source as claimed in claim 2 or 4 wherein the light source is supported by supporting means.

8. A Watering device incorporating at least one light source as claimed in claim 7 wherein the supporting means comprises threading on the inside circumference of the chamber and matching threading on the light source.

9. A Watering device incorporating at least one light source as claimed in claim 7 where the supporting means comprises an over-hang of the head of a solar light.

10. A Watering device incorporating at least one light source as claimed in claim 7 wherein the supporting means comprises a plug to which the light source may be attached which partially or wholly seals the chamber.

11. A Watering device incorporating at least one light source as claimed in claim 2 or 4 wherein the light source is not attached to the inner chamber.

12. A Watering device incorporating at least one light source as claimed in any one of claim 2, 4, or 3 wherein the chamber is sealed from the exterior by a top, cap or plug.

13. A Watering device incorporating at least one light source as claimed in claim 12 wherein the cap or top may be permanently or releasably attached to the chamber and or light source(s).

14. A Watering device incorporating at least one light source as claimed in claim 13 wherein a means to releasably seal the chamber is threading on the cap and matching threading on the inside circumference of the chamber wall.

15. A Watering device incorporating at least one light source as claimed in any one of claim 2, 4, or 3 wherein the portion of the chamber which extends inwardly to the interior of the reservoir contains at least one hole.

16. A Watering device incorporating at least one light source as claimed in claim 15 wherein at least one of the holes is sealable by sealable means.

17. A Watering device incorporating at least one light source as claimed in claim 16 wherein the sealable means is a plug.

18. A Watering device incorporating at least one light source as claimed in claim 15 wherein the light source and hole or holes enable the light source to float enabling its position to be used to indicate the water level.

19. A Watering device incorporating at least one light source as claimed in any one of claim 2, 4, or 3 wherein the reservoir is calibrated to indicate the water level.

20. A Watering device incorporating at least one light source as claimed in any one of claim 2, 4, or 3 wherein the mouth of the reservoir is threaded to allow attachment to commonly available drip feed devices or watering spikes.

21. A Watering device incorporating at least one light source as claimed in claim 2 or 4 wherein the chamber is formed from a casing of the light source.

22. A Watering device incorporating at least one light source as claimed in claim 4 wherein the chamber is releasably attached to the reservoir by means of screw threading.

* * * * *